US012108770B2

(12) United States Patent
Zheng et al.

(10) Patent No.: US 12,108,770 B2
(45) Date of Patent: *Oct. 8, 2024

(54) PROCESSED CHEESE WITH CULTURED DAIRY COMPONENTS AND METHOD OF MANUFACTURING

(71) Applicant: KRAFT FOODS GROUP BRANDS LLC, Chicago, IL (US)

(72) Inventors: Zuoxing Zheng, Buffalo Grove, IL (US); Ammar N. Chinwalla, Gurnee, IL (US); Christine D. Marcus-Johnson, Chicago, IL (US); Divya Shree Reddy, Lake Zurich, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/884,896

(22) Filed: Aug. 10, 2022

(65) Prior Publication Data

US 2023/0044136 A1 Feb. 9, 2023

Related U.S. Application Data

(60) Continuation of application No. 16/536,494, filed on Aug. 9, 2019, now Pat. No. 11,464,238, which is a division of application No. 13/973,660, filed on Aug. 22, 2013, now Pat. No. 10,375,972.

(60) Provisional application No. 61/692,129, filed on Aug. 22, 2012.

(51) Int. Cl.

| | |
|---|---|
| ***A23C 19/032*** | (2006.01) |
| ***A23C 19/082*** | (2006.01) |
| ***A23C 19/11*** | (2006.01) |

(52) U.S. Cl.

CPC ........ *A23C 19/0323* (2013.01); *A23C 19/082* (2013.01); *A23C 19/11* (2013.01); *A23C 2220/206* (2013.01); *A23V 2400/231* (2023.08)

(58) Field of Classification Search

CPC ... A23C 19/0323; A23C 19/082; A23C 19/11; A23C 19/08

See application file for complete search history.

(56) References Cited

U.S. PATENT DOCUMENTS

| | | | | |
|---|---|---|---|---|
| 2,744,827 | A | | 5/1956 | Mattick |
| 3,592,740 | A | | 7/1971 | Christensen |
| 3,985,901 | A | | 10/1976 | Barberan |
| 4,018,752 | A | | 4/1977 | Buhler |
| 4,091,117 | A | | 5/1978 | Mutai |
| 4,268,528 | A | | 5/1981 | Montigny |
| 4,329,374 | A | * | 5/1982 | Invernizzi .............. A23C 19/08 426/582 |
| 4,416,905 | A | | 11/1983 | Lundstedt |
| 4,518,616 | A | | 5/1985 | Czulak |
| 4,584,199 | A | | 4/1986 | Taylor |
| 4,597,972 | A | | 7/1986 | Taylor |
| 4,798,726 | A | | 1/1989 | Lagarde |
| 4,897,465 | A | | 1/1990 | Cordle |
| 4,938,973 | A | | 7/1990 | Klaver |
| 4,948,599 | A | | 8/1990 | Sagara |
| 4,957,752 | A | | 9/1990 | Ivanova |
| 5,098,721 | A | | 3/1992 | Kosikowski |
| 5,173,297 | A | | 12/1992 | Vedamuthu |
| 5,213,827 | A | | 5/1993 | Nauth |
| 5,231,165 | A | | 7/1993 | Vedamuthu |
| 5,232,849 | A | | 8/1993 | Vedamuthu |
| 5,348,881 | A | | 9/1994 | Vedamuthu |
| 5,356,640 | A | | 10/1994 | Jameson |
| 5,445,845 | A | | 8/1995 | Farkye |
| 5,458,876 | A | | 10/1995 | Monticello |
| 5,482,723 | A | | 1/1996 | Sasaki |
| 5,503,865 | A | | 4/1996 | Behringer |
| 5,527,505 | A | | 6/1996 | Yamauchi |

(Continued)

FOREIGN PATENT DOCUMENTS

| | | | |
|---|---|---|---|
| CN | 1177542 | C | 12/2004 |
| CN | 1620877 | A | 6/2005 |

(Continued)

OTHER PUBLICATIONS

Amiali, M. N., et al., "High nisin Z production by Lactococcus lactis UL719 in whey permeate with aeration." World Journal of Microbiology & Biotechnology, 1998, vol. 14, issue 6, pp. 887-894, Abstract from CAB Abstracts, 1 page.

Annual Report, 1971, India, National Dairy Research Institute, 1972, p. 234, Abstract from CAB Abstracts, 1 page.

Annual Report, 1973, India, National Dairy Research Institute, 1974, p. 277, Abstract from CAB Abstracts, 1 page.

Anon, "Ingredients for and from fermentation." Food Technology, 1993, vol. 47, issue 12, pp. 96-98, Abstract from Foodline(R): Science, 1 page.

(Continued)

*Primary Examiner* — Jeffrey P Mornhinweg

(74) *Attorney, Agent, or Firm* — Fitch, Even, Tabin & Flannery LLP

(57) ABSTRACT

A processed cheese composition and methods of making the processed cheese composition are provided. The processed cheese composition includes natural cheese, dairy materials and a cultured dairy component. The raw cheese is provided in a range of about 10 to about 90 weight %. The dairy materials are provided in a range of about 5 to about 50 weight % and include at least one of the group consisting of milk protein concentrate, whey protein concentrate, whey, milkfat and cream. The cultured dairy component is provided in a range of about 1 to about 20 weight % and includes an antibacterial material and/or antibacterial producing bacterial culture in combination with an exopolysaccharide and/or an exopolysaccharide producing culture.

15 Claims, 16 Drawing Sheets

Specification includes a Sequence Listing.

(56) References Cited

U.S. PATENT DOCUMENTS

| | | | |
|---|---|---|---|
| 5,547,691 | A | 8/1996 | Kjaer |
| 5,594,103 | A | 1/1997 | Devos |
| 5,626,893 | A | 5/1997 | Reddy |
| 5,635,368 | A | 6/1997 | Lommi |
| 5,654,025 | A | 8/1997 | Raghunath |
| 5,716,811 | A | 2/1998 | Nauth |
| 5,872,001 | A | 2/1999 | Caufield |
| 5,895,680 | A | 4/1999 | Cirigliano |
| 5,928,946 | A | 7/1999 | Devos |
| 6,090,417 | A | 7/2000 | Mehnert |
| 6,110,509 | A | 8/2000 | Nauth |
| 6,120,809 | A | 9/2000 | Rhodes |
| 6,132,787 | A | 10/2000 | Bunger |
| 6,136,351 | A | 10/2000 | Nauth |
| 6,136,356 | A | 10/2000 | Bunger |
| 6,177,118 | B1 | 1/2001 | Blazey et al. |
| 6,242,016 | B1 | 6/2001 | Mehnert |
| 6,319,526 | B1 | 11/2001 | Dahlstrom |
| 6,372,268 | B1 | 4/2002 | Silver |
| 6,376,005 | B2 | 4/2002 | Bunger |
| 6,403,134 | B1 | 6/2002 | Nayyar |
| 6,426,102 | B1 | 7/2002 | Isom et al. |
| 6,613,364 | B2 | 9/2003 | Begg |
| 6,689,402 | B1 | 2/2004 | Nauth |
| 6,720,018 | B2 | 4/2004 | Kawachi |
| 6,797,308 | B2 | 9/2004 | Pasch |
| 7,026,004 | B2 | 4/2006 | Loh |
| 7,115,291 | B1 | 10/2006 | Kuma |
| 7,323,204 | B2 | 1/2008 | Zheng |
| 7,556,833 | B2 | 7/2009 | Dias |
| 7,560,127 | B2 | 7/2009 | Dambmann |
| 7,842,325 | B2 | 11/2010 | Fitzsimons |
| 7,927,638 | B2 | 4/2011 | Kuma |
| 7,968,499 | B2 | 6/2011 | Gandhi |
| 8,241,690 | B2 | 8/2012 | Koertner |
| 8,337,923 | B2 | 12/2012 | Coyne |
| 8,703,217 | B2 | 4/2014 | Galer |
| 2002/0012719 | A1 | 1/2002 | Nadland |
| 2002/0025361 | A1 | 2/2002 | Kawachi |
| 2004/0022894 | A1 | 2/2004 | Kim |
| 2004/0228949 | A1 | 11/2004 | Pasch |
| 2004/0258798 | A1 | 12/2004 | Rhodes |
| 2005/0042341 | A1 | 2/2005 | Thomas |
| 2005/0112233 | A1 | 5/2005 | Noble |
| 2005/0112238 | A1 | 5/2005 | Dias |
| 2005/0129826 | A1 | 6/2005 | Warmerdam |
| 2005/0136168 | A1 | 6/2005 | Cha |
| 2005/0158423 | A1 | 7/2005 | Geis |
| 2005/0226974 | A1 | 10/2005 | Faragher |
| 2005/0287272 | A1 | 12/2005 | Zheng |
| 2006/0057131 | A1 | 3/2006 | Simard |
| 2006/0062873 | A1 | 3/2006 | Yee |
| 2006/0134297 | A1 | 6/2006 | Bell |
| 2006/0182846 | A1 | 8/2006 | Trecker |
| 2006/0257539 | A1 | 11/2006 | Zheng |
| 2007/0059398 | A1 | 3/2007 | Archer |
| 2007/0264394 | A1 | 11/2007 | Dutreux |
| 2008/0050467 | A1 | 2/2008 | Schlothauer |
| 2008/0139487 | A1 | 6/2008 | Haan |
| 2008/0152757 | A1 | 6/2008 | Zheng |
| 2008/0160134 | A1 | 7/2008 | Hestekin |
| 2008/0219960 | A1 | 9/2008 | Nierop Groot |
| 2008/0254165 | A1 | 10/2008 | Patel |
| 2009/0263887 | A1 | 10/2009 | Keeler |
| 2010/0074992 | A1 | 3/2010 | Horiuchi |
| 2011/0053832 | A1 | 3/2011 | Antoniewski |
| 2011/0117241 | A1 | 5/2011 | Koertner |
| 2011/0123674 | A1 | 5/2011 | Wolfschoon |
| 2011/0129568 | A1 | 6/2011 | Fukui |
| 2011/0159163 | A1 | 6/2011 | Huisman |
| 2011/0177218 | A1 | 7/2011 | Visser |
| 2011/0244105 | A1 | 10/2011 | Galer |
| 2012/0052181 | A1 | 3/2012 | Rivera |
| 2013/0011516 | A1 | 1/2013 | Griffin |
| 2013/0052325 | A1 | 2/2013 | Horan |
| 2014/0057018 | A1 | 2/2014 | Zheng |
| 2015/0157036 | A1 | 6/2015 | Marcus-Johnson |

FOREIGN PATENT DOCUMENTS

| | | | |
|---|---|---|---|
| CN | 102715249 | A | 10/2012 |
| EP | 082581 | A1 | 6/1983 |
| EP | 0144274 | | 6/1988 |
| EP | 0712935 | | 6/2002 |
| EP | 1230861 | | 8/2002 |
| EP | 1016709 | | 4/2005 |
| EP | 1535519 | | 6/2005 |
| EP | 1752046 | | 2/2007 |
| EP | 1613172 | | 6/2007 |
| EP | 1009243 | | 8/2007 |
| EP | 1386540 | A1 | 3/2009 |
| EP | 2011402 | | 2/2011 |
| EP | 2338349 | | 6/2011 |
| EP | 3079480 | | 10/2016 |
| JP | 2007527213 | | 9/2007 |
| JP | 2007267736 | | 10/2007 |
| JP | 6495282 | B | 4/2019 |
| KR | 20010100985 | | 11/2001 |
| WO | 1989012399 | | 12/1989 |
| WO | 1995031561 | | 11/1995 |
| WO | 2000027214 | | 5/2000 |
| WO | 2004029082 | | 4/2004 |
| WO | 2009108074 | | 9/2009 |
| WO | 2011146916 | | 11/2011 |
| WO | 2012085009 | | 6/2012 |
| WO | 2012085010 | | 6/2012 |
| WO | 2014031842 | | 2/2014 |

OTHER PUBLICATIONS

Bachmann et al., "A high-throughput cheese manufacturing model for effective cheese starter culture screening." Journal of Dairy Science, Dec. 2009, vol. 92, issue 12, pp. 5868-5882, Abstract from Medline, 2 pages.

Barnby-Smith et al., "Production of antimicrobial compounds by lactic acid bacteria." Research Report-British Food Manufacturing Industries Research Association, 1989, (662): p.(iv) + 53, Abstract from CAB Abstracts, 1 page.

Bayoumi, "Nisin and yoghurt manufacture." Chemie Mikrobiologie Technologie der Lebensmittel, 1991, vol. 13, (3/4), pp. 65-69, Abstract from Food Sci.&Tech.Abs, 1 page.

Benech et al., "Inhibition of Listeria innocua in cheddar cheese by addition of nisin Z in liposomes or by in situ production in mixed culture." Applied and Environmental Microbiology, Aug. 2002, vol. 68, issue 8, pp. 3683-3690, Abstract from Medline, 3 pages.

Bonnet et al., "Acid-tolerant Listeria monocytogenes persist in a model food system fermented with nisin-producing bacteria." Letters in Applied Microbiology, 2005, vol. 40, issue 4, pp. 237-242, Abstract from Foodline(R): Science, 1 page.

Choi et al., "Production of a nisin-like bacteriocin by Lactococcus lactis subsp. *lactis* A164 isolated from kimchi." Journal of Applied Microbiology, 2000, vol. 88, issue 4, pp. 563-571, Abstract from Food Sci.&Tech.Abs, 1 page.

Christiansen et al., "Potential of anticlostridial Lactobacillus isolated from cheese to prevent blowing defects in semihard cheese." International Journal of Dairy Technology, Nov. 2010, vol. 63, issue 4, pp. 544-551, Abstract from Academic Search Complete, 2 pages.

De Vuyst, Luc, et al., "Nisin, A Lantibiotic Produced by Lactocoocus lactis subsp. *lactis*: Properties, Biosynthesis, Fermentation and Applications," Bacteriocins of Lactic Acid Bacteria, Chapter 5, Chapman & Hall, 1994, pp. 151-221.

Doleyres et al., "Increased stress tolerance of Bifidobacterium longum and Lactococcus lactis produced during continuous mixed-strain immobilized-cell fermentation." Journal of Applied Microbiology, 2004, vol. 97, issue 3, pp. 527-539, Abstract from Food Sci.&Tech.Abs, 1 page.

Doleyres, "Increased stress tolerance of Bifidobacterium longum and Lactococcus lactis produced continuous mixed-strain immobilized-

(56) References Cited

OTHER PUBLICATIONS cell fermentation." Journal of Applied Microbiology, 2004, vol. 97, issue 3, pp. 527-539, Abstract from Foodline(R): Science, 1 page.
Fallico et al., "Novel conjugative plasmids from the natural isolate Lactococcus lactis subspecies *cremoris* DPC3758: A repository of genes for the potential improvement of dairy starters." Journal of Dairy Science, Jul. 2012, vol. 95, issue 7, pp. 3593-3608, Abstract from Medline, 2 pages.
Garcia-Parra et al., "Enhancement of nisin production in milk by conjugal transfer of the protease-lactose plasmid pLP712 to the wild strain Lactococcus lactis UQ2." International Journal of Dairy Technology, Nov. 2010, vol. 63, issue 4, pp. 523-529, Abstract from Academic Search Complete, 2 pages.
Goulhen, "Production of a nisin Z/pediocin mixture by pH-controlled mixed-strain batch cultures in supplemented whey permeate." Journal of Applied Microbiology, vol. 86, issue 3, pp. 399-406, Abstract from CAB Abstracts, 1 page.
Grattepanche et al., "Quantification by real-time PCR of Lactococcus lactis subsp. *cremoris* in milk fermented by a mixed culture." Applied Microbiology And Biotechnology, Jan. 2005; vol. 66, issue 4, pp. 414-421. Date of Electronic Publication: Jul. 23, 2004, Abstract from Medline, 2 pages.
Grattepanche, F et al., "Milk fermentation by functional mixed culture producing nisin Z and exopolysaccharides in a fresh cheese model", International Dairy Journal, 2007, vol. 17, pp. 123-132.
Gregory, "Water-soluble vitamins in milk and milk products." Journal of Dairy Research, 1975, vol. 42, issue 1, pp. 197-216, Bibliographic Information from Science, 4 pages (Abstract only).
Hassan, A.N., "ADSA Foundation Scholar Award: Possibilities and Challenges of Exopolysaccharide-Producing Lactic Cultures in Dairy Foods." Journal of Dairy Science, 2008, vol. 91, pp. 1282-1298.
Hassan, A.N., et al., "Reduced Fat Process Cheese Made from Young Reduced Fat Cheddar Cheese Manufactured with Exopolysaccaride-Producing Cultures." Journal of Dairy Sciences, 2007, vol. 90, pp. 3604-3612.
International Search Report and Written Opinion issued in PCT/US2013/056169, dated Dec. 17, 2013, 11 pages.
International Search Report and Written Opinion, International Patent Application No. PCT/US2014/069278, completion date Mar. 5, 2015, 12 pages.
Ivana et al., "Characterization and Antimicrobial Activity of Natural Isolate Lactococcus Lactis Subsp. *lactis* BGSM1-19." Acta Veterinaria, 2007, vol. 57, issue 5/6, pp. 509-521, Abstract from Academic Search Complete, 3 pages.
Janevski, O., et al., "Application of salt whey in process cheese food made from Cheddar cheese containing exopolysaccharides." Journal of Dairy Science, vol. 95, 2012, pp. 3609-3616.
Jay, "Modern food microbiology." Van Nostrand Reinhold, New York, 1986, 3rd edition, 257-406, Bibliographic Information from Science, 1 page.
Kanatani et al., "Inhibition of hiochi-bacteria by nisin." Journal of Fermentation and Bioengineering, 1992, vol. 74, issue 3, pp. 194-195, Abstract from Food Sci.&Tech.Abs, 1 page.
Krastanov et al., "Antimicrobial activity of nisin immobilized onto membrane." Bulgarian Journal of Agricultural Science, 2000, vol. 6, issue, 3, pp. 333-337, Abstract from CAB Abstracts, 1 page.
Krastanov, "Controlling of malolactic fermentation and Lactobacillus brevis grow with immobilized onto membrane nisin." Khranitelnovkusova Promishlenost, 2007, No. 1, pp. 41-44, Abstract from Food Sci.&Tech.Abs; 1 page.
Lacroix, "Production of bacteriocin from whey permeate by fermentation with lactic acid bacteria." Whey: proceedings of the second international whey conference, held in Chicago, USA, Oct. 27-29, 1997, Bibliographic Information from CAB Abstracts, 1 page.
Lee et al., "The binding and degradation of nisin by mixed ruminal bacteria." FEMS Microbiology Ecology, 2002, vol. 42, No. 3: pp. 339-345, Abstract from CAB Abstracts, 1 page.
Lipinska et al., "Studies on the production and utilization of nisin-containing milk powder in feeding of calves." Roczniki Instytutu Przemyslu Mleczarskiego, 1978, vol. 20, issue 3, pp. 27-40, Abstract from CAB Abstracts, 1 page.
Meijer, "Expression and release of proteolytic enzymes of Lactococcus lactis: ripening of UF-cheese." Wageningen Agricultural University, Wageningen Netherlands, 1997, Abstract from CAB Abstracts, 1 page.
Mills et al., "Inhibitory activity of Lactobacillus plantarum LMG P-26358 against Listeria innocua when used as an adjunct starter in the manufacture of cheese." Microbial Cell Factories, 2011, vol. 10, issue Supplement 1, pp. 1-11, Abstract from Academic Search Complete, 2 pages.
Mills et al., "The changing face of dairy starter culture research: From genomics to economics." International Journal of Dairy Technology, May 2010, vol. 63, issue 2, pp. 149-170, Abstract from Academic Search Complete, 2 pages.
Nykanen et al., "Synergistic antimicrobial effect of nisin whey permeate and lactic acid on microbes isolated from fish." Letters in Applied Microbiology, 1998, vol. 27, issue 6, pp. 345-348, Abstract from CAB Abstracts, 1 page.
Qiao, M., et al., "Regulation of the nisin operons in Lactococcus lactis N8." Journal of Applied Bacteriology, 1996, vol. 80, pp. 626-634.
Reunanen et al., "Microplate bioassay for nisin in foods, based on nisin-induced green fluorescent protein fluorescence." Applied and Environmental Microbiology, 2003, vol. 69, issue 7, pp. 4214-4218, Abstract from Food Sci.&Tech.Abs, 1 page.
Schillinger et al., "Application of nisin in combination with protective cultures to inhibit Listeria monocytogenes in two mild delicatessen salads." Archiv fur Lebensmittelhygiene, Nov.-Dec. 2001, vol. 52, issue 6, pp. 116-119, Abstract from Foodline(R): Science, 1 page.
Schillinger et al., "Efficacy of nisin in combination with protective cultures against Listeria monocytogenes Scott A in tofu." International Journal of Food Microbiology, 2001, vol. 71, (2/3): p. 159-168, Abstract from CAB Abstracts, 1 page.
Schillinger et al., "Use of nisin in combination with protective cultures for inhibition of Listeria monocytogenes in two mild delicatessen salads." Archiv fuer Lebensmittelhygiene, 2001, vol. 52, issue 6, pp. 113-144, Abstract from Food Sci.&Tech.Abs, 1 page.
Su et al., "Studies on the natural antimicrobial agents of lactic bacteria. II. Cultured conditions on antimicrobial agents-producing lactic bacteria and separation of antimicrobial agents." Journal of the Chinese Agricultural Chemical Society, 1988, vol. 26, issue 2, pp. 197-203, Abstract from Food Sci.&Tech.Abs, 1 page.
Trmcic et al., "Expression of nisin genes in cheese—a quantitative real-time polymerase chain reaction approach." Journal of Dairy Science, Jan. 2011, vol. 94, issue 1, pp. 77-85, Abstract from Medline, 2 pages.
Veljovic et al., "Preliminary characterization of lactic acid bacteria isolated from Zlatar cheese." Journal of Applied Microbiology, Dec. 2007, vol. 103, issue 6, pp. 2142-2152, Abstract from Academic Search Complete, 2 pages.
Welch, "Spoilage of Feta cheese produced by ultrafiltration techniques and the potential use of nisin in its prevention." North European Dairy Journal, 1985, vol. 51, issue 6, pp. 162-166, Abstract from Food Sci.&Tech.Abs, 1 page.
"Milk and Dairy Products in Human Nutrition." Food and Agriculture Organization of the United Nations, Chapter 3, 2013, 110 pages.
Kallinteri, L.D., et al., "Efficacy of Nisin and/or Natamycin to Improve the Shelf-Life of Galotyri Cheese." Food Microbiology, vol. 36, May 29, 2013, pp. 176-181.
Food Composition Table 2016, 7th edition, Supervised by Yoshiko Kagawa, Kagawa Nutrition University Publishing Division, Apr. 1, 2016, p. 186-187.
Firmesse, O., et al. "Fate and effects of cammenbert cheese micro-organisms in the human colonic microbiota of healthy volunteers after regular camembert consumption." International Journal of Food Microbiology, vol. 125, No. 2, pp. 176-181, 2008.

(56) References Cited

OTHER PUBLICATIONS

Office Action for Japanese Patent Application No. 2019-040889 dated Aug. 4, 2020.

* cited by examiner

| | 329 | | | ATCC 11454 | | | NB1 | | |
|---|---|---|---|---|---|---|---|---|---|
| Gene/nt position | Position | Reference | Change | Position | Reference | Change | Position | Reference | Change |
| acmD | No Changes | | | No Changes | | | 409 | T | C |
| 180-610 | | | | | | | 447 | G | A |
| | | | | | | | 600 | T | A |
| | | | | | | | | | |
| gapB | No Changes | | | 433 | A | G | No Changes | | |
| 70-510 | | | | | | | | | |
| | | | | | | | | | |
| pdhD | No Changes | | | 823 | T | A | 619 | C | T |
| 515-910 | | | | | | | 634 | G | A |
| | | | | | | | 823 | T | A |
| | | | | | | | | | |
| pepC | No Changes | | | No Changes | | | 306 | C | T |
| 250-680 | | | | | | | 349 | T | G |
| | | | | | | | 370 | A | G |
| | | | | | | | 613 | A | G |
| | | | | | | | | | |
| thrE | No Changes | | | No Changes | | | 256 | C | T |
| 110-535 | | | | | | | 262 | C | T |
| | | | | | | | 293 | C | G |
| | | | | | | | 390 | A | G |
| | | | | | | | 487 | T | A |
| | | | | | | | | | |
| yjjD | | | | | | | | | |
| 1165-1590 | No Changes | | | No Change | | | 1214 | T | C |
| | | | | | | | 1397 | C | T |
| | | | | | | | 1488 | C | T |
| | | | | | | | 1534 | C | T |
| | | | | | | | 1538 | C | A |
| | | | | | | | 1554 | A | G |
| | | | | | | | 1566 | C | T |
| | | | | | | | 1569 | C | A |
| | | | | | | | 1573 | G | A |
| | | | | | | | | | |
| yyaL | No Changes | | | 544 | T | A | 578 | T | C |
| 400-830 | | | | 578 | T | C | | | |
| | | | | | | | | | |
| Nisin Type | A | | | A | | | Z | | |

- Specific changes in nucleotides are listed for each of the genes examined

Fig. 10

| Phage | | Host | | |
|---|---|---|---|---|
| Name | Number | 329 | NB-1 | ATCC 11454 |
| 2T1 | 61 | R | S | R |
| VT6 | 136 | R | R | R |
| 2-3 | 151 | R | S | R |
| PP | 211 | R | R | R |
| EL-2 | 213 | R | R | R |
| N046 | 219 | R | R | R |
| N067 | 220 | R | R | R |
| NC | 221 | R | R | R |
| SP | 222 | R | R | R |

R=Resistant
S=Sensitive

| Culture | Phage Type |
|---|---|
| 329 | 1 |
| NB-1 (ATCC PTA-8748) | 2 |
| ATCC 11454 | 1 |

1=No Phages have been identified
2=Phages have been identified Pattern #1

Fig. 11

| | Sample Number | | RiboGroup |
|---|---|---|---|
| 1 | Strain 329 | *Lactococcus lactis* ss. lactis | ECORI 103-1623-S-1 |
| 2 | Strain NB-1 (ATCC PTA-8748) | *Lactococcus lactis* ss. lactis | ECORI 103-1640-S-5 |
| 3 | Strain ATCC 11454 | *Lactococcus lactis* ss. lactis | ECORI 103-1613-S-2 |

RiboPrint™ Pattern

| Strain | RiboGroup | RiboType |
|---|---|---|
| 329 | EcoRI 103-1623-S-1 | 3 |
| NB-1 | EcoRI 103-1640-S-5 | 5 |
| ATCC 11454 | EcoRI 103-1613-S-2 | 2 |

| Kraft Culture 329 | L. lactis subsp. Lactis CV56 | L. lactis subsp. Lactis IO-1 | L. lactis subsp. Lactis KF147 | L. lactis subsp. Cremois A76 | Gene Name Annotation | |
|---|---|---|---|---|---|---|
| 1 | 0 | 1 | 1 | 1 | Transcriptional regulator XRE Family | EPS Cluster |
| 1 | 0 | 0 | 1 | 1 | Esterase EpsX | |
| 1 | 0 | 0 | 1 | 0 | Tyrosin-protein kinase transmembrane modulator | |
| 1 | 0 | 0 | 1 | 1 | Tyrosin-Protein Kinase | |
| 1 | 0 | 0 | 0 | 0 | Undecaprenyl-phosphate galactose | |
| 1 | 0 | 0 | 1 | 1 | Manganese Dependent Tyrosine-protein phosphatase | |
| 1 | 0 | 0 | 0 | 0 | Polysaccharide biosynthesis protein cpsF | |
| 1 | 0 | 0 | 0 | 0 | Glycosyltransferase cpsg | |
| 1 | 0 | 0 | 0 | 0 | Glycosyltransferase Family 2 protein | |
| 1 | 0 | 1 | 0 | 1 | Sugar Transferase EpsL | |
| 1 | 0 | 0 | 0 | 0 | Protein of unknown function | |
| 1 | 0 | 0 | 0 | 0 | Protein of unknown function ( back end of the gene similar to S.thermophilus eps type VII operon) | |
| 1 | 0 | 0 | 0 | 0 | Polysaccharide biosynthesis protein cpsm (portion similar to S.agalactiae gene in cps cluster) | |
| 1 | 1 | 1 | 1 | 0 | Nisin Precursor NisinA | Nisin Cluster |
| 1 | 1 | 1 | 0 | 0 | Nisin Biosynthesis protein NisB | |
| 1 | 1 | 1 | 1 | 0 | Nisin Transport ATP-binding protein nisT | |
| 1 | 1 | 1 | 0 | 0 | Nisin biosynthesis protein NisC | |
| 1 | 1 | 1 | 1 | 0 | Nisin Immunity protein NisI | |
| 1 | 1 | 1 | 0 | 1 | Nisin Leader peptide-processing serine protease nisP | |
| 1 | 1 | 1 | 1 | 0 | Nisin biosynthesis two-component system, response regulator NisR | |
| 1 | 1 | 1 | 1 | 0 | Nisin biosynthesis two-component system, sendor histidine kinase NisK | |
| 1 | 1 | 1 | 1 | 0 | Nisin transport protein NisF | |
| 1 | 1 | 1 | 1 | 0 | Nisin transport protein NisE | |
| 1 | 1 | 1 | 1 | 0 | Nisin transport protein NisG | |
| 0 | 0 | 0 | 0 | 0 | nisin resistance protein | |

CV56 is a nisin producer
IO-1 is a nisin producer
KF147 is not a nisin producer but is nisin resistant.
A76 is not a nisin producer

Fig. 13

SEQUENCE LISTING

```
Sequence total quantity: 33
SEQ ID NO: 1            moltype = AA  length = 34
FEATURE                 Location/Qualifiers
SITE                    2
                        note = MISC_FEATURE - Dehydrobutyrine
                         (beta-methyldehydroalanine)
CROSSLNK                3..7
                        note = THIOETH -
SITE                    5
                        note = MISC_FEATURE - Dehydroalanine
CROSSLNK                8..11
                        note = THIOETH -
SITE                    8
                        note = MISC_FEATURE - Amino butyric acid
CROSSLNK                13..19
                        note = THIOETH -
SITE                    13
                        note = MISC_FEATURE - Amino butyric acid
CROSSLNK                23..26
                        note = THIOETH -
SITE                    23
                        note = MISC_FEATURE - Amino butyric acid
CROSSLNK                25..28
                        note = THIOETH -
SITE                    25
                        note = MISC_FEATURE - Amino butyric acid
SITE                    33
                        note = MISC_FEATURE - Dehydroalanine
source                  1..34
                        mol_type = protein
                        organism = Lactococcus lactis
SEQUENCE: 1
IXAIXLAXPG AKXGALMGAN MKXAXAHASI HVXK                              34

SEQ ID NO: 2            moltype = DNA  length = 1086
FEATURE                 Location/Qualifiers
source                  1..1086
                        mol_type = genomic DNA
```

```
                         organism = Lactococcus lactis
SEQUENCE: 2
atgaaacaga aacataaatt agcgcttggt gcgtcaattg ttgctttggc aagtcttggt  60
gggattaaag cacaagctgc atctgttcaa gaaattatta acgctgcggt accagtggca  120
aatgactacg gactttatcc atcagtaatg attgcccaag ggattttaga atcaagtggt  180
ggacaaagtg ccttagcaag caattataat aatatttttg gagttaaata cacttctggt  240
acacctgttt atctaccaac acaagagtat ttgaatggaa caatgacaaa tgttgttgaa  300
cccttccaag cttatagctc agtttatgac gcatgtgttg cccaagctaa aatgttacgt  360
gcttcatcat attattctgg ggcttggcgt gaaaatacaa gttcttactt agatgcgaca  420
gcttggcttg aaggacgtta tgccacggat ccaacttatg cttctaaatt gaatagcgtg  480
atttctgaac ttggtttaag tgtttatgac caaggaggag aaatatcagg aggaactgct  540
gttacaacta gttcatcagc ctcaacaaat tcagctggca catacaaagt acaagagggt  600
gattcattat cagcaatcgc tgctcaatat ggtacaactg ttgatgcact tgtgtcagca  660
aatagtttag aaaatgcgaa cgatattcat gtaggagaag ttttgcaagt tgctggtgct  720
agcacaacta caacaagtac caatacaact tccaatgtat cgtcaagttc tacttatacc  780
gtcaaatcag gagatagttt atattcgatt gcggaacaat atggaatgac tgtttcatca  840
ctgatgtcag ccaatggaat ttatgatgtt aattcaatgc ttcaagtagg acaagtattg  900
caagtaactg taagtactag tgcaacaact tcaaacacaa cgacttcaaa cagttataca  960
attcaaaatg gtgacagcat ttattcaatt gccacagcaa atggtatgac agctgaccaa  1020
ttagcagccc tcaatggatt tggaattaat gacatgattc atccaggaca aacaattaga  1080
atctaa                                                             1086

SEQ ID NO: 3             moltype = DNA  length = 1011
FEATURE                  Location/Qualifiers
source                   1..1011
                         mol_type = genomic DNA
                         organism = Lactococcus lactis
SEQUENCE: 3
atggtagtta aagttggtat taacggtttc ggtcgtatcg gtcgtcttgc tttccgtcgt  60
attcaaaatg ttgaaggtgt tgaagttgtt gcaatcaacg acttgacaga tccagcaatg  120
cttgctcact tgcttaaata cgatacaact caaggtcgtt ttgatggtaa agttgaagtt  180
aaagatggtg gttttgaagt taacggtaaa ttcgttaaag ttactgctga atctaaccca  240
gctaacatca actgggctga agttggtgca gaaatcgttc ttgaagcaac tggtttcttc  300
gcaactaaag aaaaagctga acaacacttg cacgctaacg gtgctaaaaa agttgttatc  360
actgcacctg gtggatctga tgttaaaaca atcgttttca acactaacca cgaagtactt  420
gatggaactg aaacagtaat ttcagctggt tcatgtacaa ctaactgtct tgctccaatg  480
gctgatactt tgaacaaaca attcggtatc aaagttggta caatgactac agttcacggt  540
tacactggtg accaaatgac tcttgatggc ccacaccgtg gtggagactt ccgtcgcgca  600
cgtgctgcag ctgaaaacat cgtacctaac tcaacaggtg ctgctaaagc tatcggtctt  660
gtattgccag aacttcaagg taaacttcaa ggacatgctc aacgtgtacc agttccaact  720
ggttcattga ctgaacttgt tactatcctt aacaaagaag ttacagttga cgaaatcaac  780
gcagctatga aagctgcttc aaatgaatca tttggttaca acgaagacca aatcgtttca  840
tctgatatcg ttggtatctc aaactcttca ctctttgatg ctactcaaac tgaagttact  900
tcagctgatg gagctcaact tgttaaaact gtatcttggt acgataacga aatgtcatac  960
acttcaaacc ttgttcgtac acttgcatac ttcgctaaaa tcgctaaata a           1011

SEQ ID NO: 4             moltype = DNA  length = 1419
FEATURE                  Location/Qualifiers
source                   1..1419
                         mol_type = genomic DNA
                         organism = Lactococcus lactis
SEQUENCE: 4
atggttgttg gtgcacaagc aacagaagtt gatttggttg ttattggttc aggccctggt  60
ggttatgttg cagccatccg tgcggctgaa cttggtaaaa aagttacaat tattgaaaaa  120
gataatgttg gtggggtttg tttaaatatt ggttgtatcc catcaaaagc attgattaat  180
attggtcatc attaccaaga atctttggag gaagaaaaag gagaaaatcc ttttggtctt  240
tctgtcggaa atgttaaatt aaactgggaa tctgcccaaa aatggaaaca agataaagtt  300
gtcaaccagt tgacaggtgg tgttaaaatg ctacttaaaa aacacaaagt tgacgtgatt  360
caaggaactg cagaatttat tgataacaat acaataaatg ttgaacaaga agatgggttc  420
caacttttgc aatttaatga tgtgattatc tcaactggtt cacgtcctat cgaaattcct  480
tctttcccat ttggtggtcg cattattgac tctactggtg ctttgtcact tccagaagtt  540
cctaaacatt tgattattgt tgggggagga gttattggtt ctgagcttgg tggagcatac  600
cgtatgctcg gttctaagat tacaattgtt gaaggtttgg accacatttt aaacgggttt  660
gataaagaaa tgtctgatat cattgctaat cgcgttaaat ctgctggttc tgaaatcttt  720
acttcagcaa tggctaaatc agctactcaa actgataaag atgtaacttt gacttttgag  780
gttgacggaa aagaacaaac ggtgactggt gattacttac tcgtttctgt tggacgtcgt  840
ccaaatactg atttaatcgg cttgaacaac actgatgtta aattgactga ccgtggtttg  900
attgaagttg acgattctta tgcaactaat gttcctcaca tttatgcaat cggtgatgtg  960
gttcctggtc caatgctcgc tcacaaagct tctttccaag ctaaagttgc tgctgctgcg  1020
attgctggag ctgaggacga cgtggactta cacgttgctt tgcctgctgt agcttataca  1080
acaactgaat tagcaacagt tggagaaacg cctgaatcag ttaaagaccg taaagatgtt  1140
aaaatttcta agttcccatt tgctgcaaat ggccgtgcca tttcaatgaa tgatacgact  1200
ggtttcttac gtttgattac tgaaactaaa gaaggggcct taatcggtgc tcaaatcgtt  1260
ggccctggtg catctgactt gatttctggt ttatcactag cgattgaaaa tggattgact  1320
tctaaagaca tttcattgac tatccaacct cacccaacac ttggtgaagc gattatggat  1380
acagctgaat tggctgatgg cttaccaatt cacgtttaa                         1419

SEQ ID NO: 5             moltype = DNA  length = 1311
FEATURE                  Location/Qualifiers
```

-continued

```
source                 1..1311
                       mol_type = genomic DNA
                       organism = Lactococcus lactis
SEQUENCE: 5
atgacagtaa catcagattt cacacaaaaa ctctacgaaa attttgcaga aaatacaaaa  60
ttgcgtgcgg tggaaaatgc cgtgactaaa aatggtttgc tttcatcact cgaagtccgt  120
ggttcacatg cagcaaattt gcctgagttt tcaattgact tgacaaaaga ccctgtaacg  180
aatcaaaaac aatctggtcg ttgctggatg tttgctgctt tgaacacttt ccgtcataaa  240
tttatcaatg aatttaaaac agaggatttt gagttttcac aagcttacac tttcttctgg  300
gataaatatg aaaaatcaaa ctggttcatg gaacaaatta ttggtgatat tgaaatggac  360
gatcgtcgtt tgaaattcct tttacaaaca ccacaacaag atggcggcca atgggatatg  420
atggttgcaa tttttgaaaa atatggaatt gttcccaaag ctgtttatcc tgaatcacaa  480
gcttcaagta gctcacgtga attgaatcaa tacttgaata aactactccg tcaagatgct  540
gaaattttgc gttatacaat tgagcaaggt ggagatgttg aagcagttaa agaagaactt  600
ttgcaagaag tctttaattt ccttgcggta actttaggtt tgccaccaca aaattttgaa  660
tttgctttcc gtaataaaga taatgaatac aaaaaatttg ttggtagtcc aaaagaattt  720
tacaatgaat atgttggaat tgatttgaat aattatgtgt cagtaatcaa tgctccaact  780
gctgacaaac cttataataa gagctacaca gttgagtttc ttggaaatgt tgtcggtggt  840
aaagaagtga aacatttgaa tgttgaaatg gaccgcttta aaaaattggc cattgcccaa  900
atgcaagctg gtgaaacagt ttggtttggt tgtgacgtgg gtcaagaatc aaatcgttca  960
gcaggacttt tgacaatgga ttcttatgat ttcaaatctt cattggatat tgaatttact  1020
caaagcaaag caggacgtct tgactatggt gagtcgttga tgacgcatgc catggtttta  1080
gcgggtgttg atttagatgc tgacggaaat tcaactaaat ggaaagttga aaattcatgg  1140
ggtaaagatg cgggtcaaaa aggatatttt gttgcctctg atgaatggat ggatgaatat  1200
acttatcaaa ttgttgtccg taaagacctt ttaactgaag aagaattggc tgcttacgaa  1260
gagaaacctc aagtacttct accatgggac ccaatgggtg ctttagctta a           1311

SEQ ID NO: 6           moltype = DNA  length = 648
FEATURE                Location/Qualifiers
source                 1..648
                       mol_type = genomic DNA
                       organism = Lactococcus lactis
SEQUENCE: 6
atgaaaaata aaattttaga cctgagggca tattttattg ctggcccaca agattttcca  60
aaactttcaa ttgatgatgc aatcgataaa atttctgtaa tcataaaaag tggagtaacg  120
gtttatcaat ttcgtgataa gggaacaatt tataaaaata aaaatcaacg attagaagta  180
gcaaaaagac tacaagaagt agctcagaaa gcggctgttt cttttattgt gaatgatgat  240
gttgaattag cgcgtgaatt gtcagctgac gggattcatg tcggacaaga cgatgattct  300
gtcagtaaaa ttcgtgagct gattggccaa gaaatgtggg taggactttc tgtcagtaat  360
gatatggaat tagaaagcgc tcaaaagagt ggggctgact atttgggaat tggtccaatt  420
tatccaacaa atagcaagtc cgacgcagca gaaccaattg gggttgacca tttaagaaaa  480
atgcttgagc ataatcaatt accaactgtt ggaattggtg gaattactga aaattcactg  540
acagagcttt caaaaattgg tctgggtgga gttgcggtaa tttctttgct gacagaatcc  600
gaaaattaca aaaatatggt tcaaaaaatt aagcaaaata ttagatga                648

SEQ ID NO: 7           moltype = DNA  length = 1623
FEATURE                Location/Qualifiers
source                 1..1623
                       mol_type = genomic DNA
                       organism = Lactococcus lactis
SEQUENCE: 7
atgaaacaac cactttataa tacaggagtt ttatttaaga ctttaataaa aagggattgg  60
tttaagttag ttttctggat tttaggaatg cttgcttttg ctgcttcagg ggcagggaaa  120
atggaagttg cctcgaatcc ggcgacggct agtactcttt atacaatgtt tgtcaaaaat  180
ccagcaatgg tcggattatt tggaccaact ccaataaata atccaactaa ttatagtctg  240
gggccgattt ttggtcaaac catgacttta attacggggc tgactttcgc tatcatttcg  300
attatttatg ttgttaatcg aagcagaaaa gaagaagatg atgggattac agaacttttt  360
cggtcttact ctattggaaa attggcaaat acgactgctt tagtcatgga acttttgctc  420
ttaaatttaa taatggctgt cttattagct ctttcaatag aggtccaaaa cgtggctggc  480
ttgaatcatt tagaaagtaa ttttctattt gctttcacaa caagcgctca gggtttcctt  540
tggggaatgt ttgctttact tttcggtcaa attttctctg aagcaagtac aactaaaggg  600
atgacatttg gtttactggg tttgttatat attgttcgaa tgctaacaga tgtaacaaat  660
ctttccatag gttggttcaa tcctctgtct tggtcttatc tagcttttcc atatgttaaa  720
ggtcatgaaa attggttagc tgtctttttg actttctct tagcttttct aattttagga  780
atatcctata ttctagagct taaaagagat gtgggagtgg ggtattttcc cgaaagaaag  840
gcgcgacttc atgggaaaaa gggacatttc ggatttcctg gtctcgtttt gaatcttgaa  900
aaaaagatga ttatcggttg gcttttggca agtttgttc tgggcttagt ttatggttca  960
atgtttggac aaatggacca atttatttca agtaataaaa ccgttaagga gctttttgtt  1020
gggaatgaaa cggcagcgag tgcgattaga ggaaacttca tggtcactct gttttcgata  1080
ttgtcaatct taatcgcagc gtttggtgta attttactga caaaaatggt gagcgaggaa  1140
agaaaaaatc gtctggaagc tctttatgct ttaccacttt cacgactaaa agtgtattcc  1200
acttatttac tgatagctat tctgtcagta attttagctc agtttttagc gctttttgga  1260
atatttattg aacagttggg taataaaaat gctttgagct tcttagaaat tatgaaatct  1320
ggcatgattt ggcttgttgc tgtcatattt gttttagcaa tacttagtct gttacttggg  1380
cttgtgcctc gtttggcaga attaatttgg gtatatcttg ctttcttact ttttatgact  1440
tatcttggaa aattattatc tttgccaaaa tggcttgaaa atttaagcat ttataactat  1500
attcctaaat tgccagttga gaaaatgaat cttcctaccg ttttattcat attaatttta  1560
tctgtcttct tagttttact tggctttgga gcttatagaa gacgcgattt aatcacgggg  1620
taa                                                                 1623
```

```
SEQ ID NO: 8            moltype = DNA  length = 1116
FEATURE                 Location/Qualifiers
source                  1..1116
                        mol_type = genomic DNA
                        organism = Lactococcus lactis
SEQUENCE: 8
atggctttaa cagcaggtat cgttggttta ccaaacgttg gtaaatcaac tctttttaat  60
gcaattacaa aagcaggcgc agaagctgca aactatcctt ttgcaacaat tgacccaaat  120
gttgggatgg tagaagtacc ggatgaacgt ttaaacaagt taacagagtt gattaaacct  180
aagaaaactg ttccgacaac ttttgaattt acagatattg ctgggattgt taaaggggct  240
tcacgcggag aaggtctagg aaataaattt cttgccaata ttcgtgaagt agatgccatc  300
attcacgttg ttcgagcttt tgatgatgaa aatgtaatgc gtgaaaataa tcgtgaagat  360
gcttttattg atccaatggc agacattgaa acaattaatc ttgaattaat tttggccgat  420
ttagaatcag tcaataaacg ttatgcgcgt gttgaaaaag ttgctcgtac ggcaaaagat  480
aaagatgcgg tcgcagaatt taatgttttg aaaaagctca aaccggtact tgaagatggt  540
aaatcagcac gaacaattga ctttgacgaa gatgaaataa aggttcttaa aagcttgttc  600
ttattgacaa gtaaaccagt tctttatgta gctaatgttt cagaagatga agtaggcgaa  660
cctgataata tcgaatacgt gaaacaaatt cgtgagtttg cggcgactga aaatgctgaa  720
gttgctgtga tttctgctcg tgttgaagaa gaaatctcag agttggaaga tgatgaaaaa  780
gcagaatttt tggaagcaat tggcttaaaa gaatctggtg ttgatatgtt gactcgtgca  840
gcttaccacc ttcttggact tgccacttac tttactgctg gtgaaaaaga agtccgtgct  900
tggaccttca agcgtggaat gaaagctcca caaatggcag gaattattca tacagacttt  960
gaaaaaggct ttatccgcgc agtaactatg tcttatgatg atttgcttaa atacggttca  1020
gaaaaagctg ttcgtgaagc cggtcgcttg cgtgaagaag gaaaagaata tgttggtcaa  1080
gatggcgaca ttatggaatt ccgtttcaac gtgtaa                            1116

SEQ ID NO: 9            moltype = DNA  length = 411
FEATURE                 Location/Qualifiers
source                  1..411
                        mol_type = genomic DNA
                        organism = Lactococcus lactis
SEQUENCE: 9
atggatcgtt atactaaaaa agtcattgct tgggatttag gaaagcgaat gactctagaa  60
ttagtgcaaa ggactttgaa taaggcaatg gaatcacaaa attatccaga agctgtgatg  120
cttcattctg accaaggaag tcagtatacg agtcatgagt atgaagagac aataaaaaac  180
tctggaatga ctcactcctt cagtcgtaag ggctatcctt atcataatgc cagtcttgaa  240
tcttggcatg gacatttaaa aagagagtgg gtgtatcaat ttaaatataa gaactttgaa  300
gaagcctatc agagtatttt ctggtacatc gaagcctttt ataattcaaa acgaatccat  360
caaagtttag ggtatcttac gcctaatcaa tttgaaaaag aaatcactta a           411

SEQ ID NO: 10           moltype = DNA  length = 645
FEATURE                 Location/Qualifiers
source                  1..645
                        mol_type = genomic DNA
                        organism = Lactococcus lactis
SEQUENCE: 10
atgataagaa gtgaatgtct caaattaaaa aatagcttag ggttttattt agtttttctc  60
tttactttat tagagctttt aacggttcct atttatttag cttttggaag aagtcatgtt  120
tcaatgactg atttatcgct catgattttt ttgtttttc cgttactggt tacaattttg  180
tctattctaa tctttgaaca ggagagtctg gccaatcgtt tccaagaaat aaatgtaaat  240
aaaaaaagta gcagaatttg gttatcaaag ctaatagtag tggatttcct tttgttcttt  300
ccatcagcaa tgatctggat aattacggga gtttcacagg cagtagggca acaaggaatg  360
atgatcgcaa cagctagctg gttgatggca atttttctta atcattttca tcttttattg  420
acctttataa tcaatcgagg agggagcatg attatcgcga ttattgaaat attactcatt  480
atttttgcca gtaataaagt tttattagca gcttattggt gtcccattgc tttacctgtt  540
aattttatga taactgggcg gtgtgcttat ctgatagctg ccgtagggtg gattgtttta  600
tccacaataa ttcttgtagc attatctaaa aaaaagatta gataa                  645

SEQ ID NO: 11           moltype = DNA  length = 729
FEATURE                 Location/Qualifiers
source                  1..729
                        mol_type = genomic DNA
                        organism = Lactococcus lactis
SEQUENCE: 11
atgaaaagaa taatagcatc agaagcaata aaattaaaaa aatcaggaac tcttagattg  60
gtattaatta tccctttttgt gactctattt atagcatttc ttatgggtgg aatacagatt  120
tttagtgttt tttcaattta ttggtgggaa actggttttt tattcctttt gatgagtttg  180
ctttttcttt atgatataaa atcagaggag caagctggaa attttcaaaa tgtgaaatgg  240
aaaaagctga gttggaaaat tcatttggcc aaaatgttgt tgatttggct aagaggtata  300
ctagcgagca tagtcttgat tattttgctt tatttggttg cttttgtgtt tcaaggtatt  360
gtagtggtgg attttatgaa agtaagtgtg gcattgattg ctatattact agcagcttct  420
tggaatttac cctttatata cttgattttc aagtggatta atacttacgt attgttagct  480
gcgaatacct tgatttgttt aattgttgcc ccttttgttg cacaaactcc agtatggttc  540
ttgctaccat acacttatca ctataaagtt acagaaagtt tgttaaatat caaaccatca  600
ggagatttgt taacagggaa gataaatttc agtatttggg aagttttatt accatttgga  660
ctttccatag ttgtaacgat aggagtttcg tatttactta aaggagtgat agaacatgat  720
aagaagtga                                                          729
```

-continued

```
SEQ ID NO: 12          moltype = DNA  length = 678
FEATURE                Location/Qualifiers
source                 1..678
                       mol_type = genomic DNA
                       organism = Lactococcus lactis
SEQUENCE: 12
atgcaggtaa aaattcaaaa tctttctaaa acatataaag aaaagcaggt gctacaagat  60
atcagttttg atattaaatc tggaacagtc tgtggtttat taggagttaa cggtgcagga  120
aaatcaactt tgatgaaaat tttgtttggt ttaatttctg cagatactgg aaaaattttt  180
tttgatggac aagaaaagac aaataatcaa cttggagcct taatcgaggc tccagcaata  240
tatatgaatt tatctgcttt cgataatctt aaaactaagg ctttgctttt tggaatttca  300
gataagagaa ttcatgaaac tctagaagtg attggtttgg cagaaacagg aaagaaaaga  360
gcaggaaaat tctctttagg gatgaaacaa cgtttgggaa ttggtatggc tattcttaca  420
gaacctcaat ttttaattct tgatgaacct actaatggtt tggatcctga tggtattgcg  480
gagttgttaa acttaatctt aaaacttaaa gctaaaggtg tgacaatctt gatttctagt  540
catcagttgc acgaaataag taaagtagct agtcaaatta ttattttgaa caaaggtaag  600
attcgttata atcgtgcgaa caataaagaa gacgacattg aacagttatt ctttaagatt  660
gtgcatggag gaatgtga                                                678

SEQ ID NO: 13          moltype = DNA  length = 687
FEATURE                Location/Qualifiers
source                 1..687
                       mol_type = genomic DNA
                       organism = Lactococcus lactis
SEQUENCE: 13
gtgtataaaa ttttaatagt tgatgatgat caggaaattt taaaattaat gaagacagca  60
ttagaaatga gaaactatga agttgcgacg catcaaaaca tttcacttcc cttggatatt  120
actgattttc agggatttga tttgattttg ttagatatca tgatgtcaaa tattgaaggg  180
acagaaattt gtaaaaggat tcgcagagaa atatcaactc caattatctt tgttagtgcg  240
aaagatacag aagaggatat tataaacggc ttaggtattg gtggggatga ctatattact  300
aagcctttta gccttaaaca gttggttgca aaagtggaag caaatataaa gcgagaggaa  360
cgcaataaac atgcagttca tgttttttca gagattcgta gagatttagg accaattaca  420
ttttatttag aagaaaggcg agtctgtgtc aatggtcaaa caattccact gacttgtcgt  480
gaatacgata ttcttgaatt actatcacaa cgaacttcta aagtttatac gagagaggat  540
atttatgatg acgtatatga tgaatattct aatgcacttt ttcggtcaat ctcggagtat  600
atttatcaga ttaggagtaa gtttgcacca tacgatatta atccgataaa aacggttcgg  660
ggacttgggt atcagtggca tgggtaa                                      687

SEQ ID NO: 14          moltype = DNA  length = 1344
FEATURE                Location/Qualifiers
source                 1..1344
                       mol_type = genomic DNA
                       organism = Lactococcus lactis
SEQUENCE: 14
atgggtaaaa aatattcaat gcgtcgacgg atatggcaag ctgtcattga aattatcata  60
ggtacttgtc tacttatcct gttgttactg ggcttgactt tctttctacg acaaattgga  120
caaatcagtg gttcagaaac tattcgttta tctttagatt cagataattt aactatttct  180
gatatcgaac gtgatatgaa acactaccca tatgattata ttattttgga caatgataca  240
agtaaaattt tgggaggaca ttatgtcaag tcggatgtac ctagttttgt agcttcaaaa  300
cagtcttcac ataatattac agaaggagaa attacttata cttattcaag caataagcat  360
ttttcagttg ttttaagaca aaacagtatg cctgaattta caaatcatac gcttcgttca  420
atttcttata atcaatttac ttacctttc tttttcttg gtgaaataat actcattatt  480
ttttctgtct atcatctcat tagagaattt tctaagaatt ttcaagccgt tcaaaagatt  540
gcattgaaga tgggggaaat aactactttt cctgaacaag aggaatcaaa aattattgaa  600
tttgatcagg ttctgaataa cttatattcg aaaagtaagg agttagcttt ccttattgaa  660
gcggagcgtc atgaaaaaca tgatttatcc ttccaggttg ctgcactttc acatgatgtt  720
aagacacctt taacagtatt aaaaggaaat attgaactgc tagagatgac tgaagtaaat  780
gaacaacaag ctgattttat tgagtcaatg aaaaatagtt tgactgtttt tgacaagtat  840
tttaacacaa tgattagtta tacaaaactt ttgaatgatg aaaatgatta caaagcgaca  900
atctccctgg aggatttttt gatagattta tcagttgagt tggaagagtt gtcaacaact  960
tatcaagtgg attatcagct agttaaaaaa acagatttaa ccacttttta cggaaataca  1020
ttagctttaa gtcgagcact tatcaatatc tttgttaatg cctgtcagta tgctaaagag  1080
ggtgaaaaaa tagtcagttt gagtatttat gatgatgaaa aatatctcta ttttgaaatc  1140
tggaataatg gtcatccttt ttctgaacaa gcaaaaaaaa atgctggaaa actatttttc  1200
acagaagata ctggacgtag tgggaaacac tatgggattg gactatcttt tgctcaaggt  1260
gtagctttaa aacatcaagg aaacttaatt ctcagtaatc ctcaaaaagg tggggcagaa  1320
gttatcctaa aaataaaaaa gtaa                                         1344

SEQ ID NO: 15          moltype = DNA  length = 2010
FEATURE                Location/Qualifiers
source                 1..2010
                       mol_type = genomic DNA
                       organism = Lactococcus lactis
SEQUENCE: 15
ttgggtttat cagcaactgt gcatggggag acaacaaatt cacaacagtt actctcaaat  60
aatattaata cggaattaat taatcataat tctaatgcaa ttttatcttc aacagaggga  120
tcaacgactg attcgattaa tctaggggcg cagtcacctg cagtaaaatc gacaacaagg  180
actgaattgg atgtaactgg tgctgctaaa actttattac agacatcagc tgttcaaaaa  240
gaaatgaaag tttcgttgca agaaactcaa gttagttctg aattcagtaa gagagatagc  300
```

-continued

```
gttacaaata aagaagcagt tccagtatct aaggatgagc tacttgagca aagtgaagta  360
gtcgtttcaa catcatcgat tcaaaaaaat aaaatcctcg ataataagaa gaaaagagct  420
aacttcgtta cttcctctcc gcttattaag gaaaaaccat caaattctaa agatgcatct  480
ggtgtaattg ataattctgc ttctcctcta tcttatcgta aagctaagga agtggtatct  540
cttagacaac ctttaaaaaa tcaaaaagta gaggcacaac ctctattgat aagtaattct  600
tctgaaaaga aagcaagtgt ttatacaaat tcacatgatt tttgggatta tcagtgggat  660
atgaaatatg tgacaaataa tggagaaagc tatgcgctct accagccctc aaagaaaatt  720
tctgttggaa ttattgattc aggaatcatg gaagaacatc ctgatttgtc aaatagttta  780
ggaaattatt ttaaaaatct tgttcctaag ggagggtttg ataatgaaga acctgatgaa  840
actggaaatc caagtgatat tgtcgacaaa atgggacacg ggacggaagt cgcaggtcag  900
attacagcaa atggtaatat tttaggagta gcaccaggga ttactgtaaa tatatacaga  960
gtatttggtg aaaatctttc gaaatcggaa tgggtagcta gagcaataag aagagctgcg  1020
gatgatggga acaaggtcat caatataagt gctggacagt atcttatgat ttcaggatcg  1080
tatgatgatg gaacaaatga ttatcaagag tatcttaatt ataagtcagc aataaattat  1140
gcaacagcaa aaggaagtat tgttgtcgca gctcttggta atgatagttt aaacatacaa  1200
gataaccaaa caatgataaa ctttcttaag cgtttcagaa gtataaaggt tcctggaaaa  1260
gttgtagatg caccgagtgt atttgaggat gtaatagccg taggtggaat agatggttat  1320
ggtaatattt ctgattttag taatattgga gcggatgcaa tttatgctcc tgctggcaca  1380
acggccaatt ttaaaaaata tggcaagat aaatttgtca gtcagggtta ttatttgaaa  1440
gattggcttt ttacaactac taatactggc tggtaccaat atgtttatgg caactcattt  1500
gctactccta aagtatctgg ggcactggca ttagtagttg ataaatatgg aataaagaat  1560
cctaaccaac taaaaaggtt tcttctaatg aattctccag aagttaatgg gaatagagta  1620
ttgaatattg ttgatttatt gaatgggaaa aataaagctt ttagcttaga tacagataaa  1680
ggtcaggatg atgctattaa acataaatcg atggagaatc ttaaagagtc tagggataca  1740
atgaaacagg aacaagataa agaaattcaa agaaatacaa ataacaattt ttctatcaaa  1800
aatgattttc ataacatttc aaaagaagta atttcagttg attataatat taatcaaaaa  1860
atggctaata atcgaaattc gagaggtgct gtttctgtac gaagtcaaga aattttacct  1920
gttactggag atggagaaga ttttttaccg gctttaggta tagtgtgtat ctcaatcctt  1980
ggtatattga aaagaaagac taaaaattga                                  2010

SEQ ID NO: 16          moltype = DNA  length = 738
FEATURE                Location/Qualifiers
source                 1..738
                       mol_type = genomic DNA
                       organism = Lactococcus lactis
SEQUENCE: 16
atgagaagat atttaatact tattgtggcc ttaataggga taacaggttt atcagggtgt  60
tatcaaacaa gtcataaaaa ggtgaggttt gacgaaggaa gttatactaa ttttatttat  120
gataataaat cgtatttcgt aactgataag gagattcctc aggagaacgt taacaattcc  180
aaagtaaaat tttataagct gttgattgtt gacatgaaaa gtgagaaact tttatcaagt  240
agcaacaaaa atagtgtgac tttggtctta aataatattt atgaggcttc tgacaagtcg  300
ctatgtatgg gtattaacga cagatactat aagatacttc cagaaagtga taagggggcg  360
gtcaaagctt tgagattaca aaactttgat gtgacaagcg atatttctga tgataatttt  420
gttattgata aaaatgattc acgaaaaatt gactatatgg gaaatattta cagtatatcg  480
gacaccaccg tatctgatga agaattggga gaatatcagg atgttttagc tgaagtacgt  540
gtgtttgatt cagttagtgg caaaagtatc ccgaggtctg aatgggggag aattgataag  600
gatggttcaa attccaaaca gagtaggacg gaatgggatt atggcgaaat ccattctatt  660
agaggaaaat ctcttactga agcatttgcc gttgagataa atgatgattt taagcttgca  720
acgaaggtag gaaactag                                                738

SEQ ID NO: 17          moltype = DNA  length = 1245
FEATURE                Location/Qualifiers
source                 1..1245
                       mol_type = genomic DNA
                       organism = Lactococcus lactis
SEQUENCE: 17
atgaataaaa aaaatataaa aagaaatgtt gaaaaaatta ttgctcaatg ggatgagaga  60
actagaaaaa ataaagaaaa cttcgatttc ggagagttga ctctctctac aggattgcct  120
ggtataattt taatgttagc ggagttaaaa aataaagata actcaaagat atatcagaaa  180
aagatagaca attatattga atatattgtt agcaaacttt caacatatgg gcttttaaca  240
ggatcacttt attcgggagc agctggcatt gcattaagta tcctacattt acgagaagat  300
gacgaaaaat ataagaatct tcttgatagc ctaaatagat atatcgaata tttcgtcaga  360
gaaaaaattg aaggatttaa tttggaaaac attactcctc ctgattatga cgtgattgaa  420
ggtttatctg ggatactttc ctatctatta ttaatcaacg acgagcaata tgatgatttg  480
aaaatactca ttatcaattt tttatcaaat ctgactaaag aaaacaatgg actaatatcg  540
ctttacatca aatcggagaa tcagatgtct caatcagaaa gtgagatgta tccactaggc  600
tgtttgaata tgggattagc acatggactt gctggagtgg gctgtatctt agcttatgcc  660
cacataaaag gatatagtaa tgaagcctcg ttgtcagctt tgcaaaaaat tatttttatt  720
tatgaaaagt ttgaacttga aaggaaaaaa cagtttctat ggaaagatgg acttgtagca  780
gatgaattaa aaaaagagaa agtaattagg gaagcaagtt tcattagaga tgcatggtgc  840
tatggaggtc caggtattag tctgctatac ttatacggag gattagcact ggataatgac  900
tattttgtag ataaagcaga aaaaatatta gagtcagcta tgcaaaggaa acttggtatt  960
gattcatata tgatttgcca tggctattct ggtttaatag aaatttgttc tttatttaag  1020
cggctattaa atacaaaaaa gtttgattca tacatggaag aatttaatgt taatagtgag  1080
caaattcttg aagaatacgg agatgaaagt ggcacgggtt ttcttgaagg aataagtggc  1140
tgtatactgg tattatcgaa atttgaatat tcaatcaatt ttacttattg gagacaagca  1200
cttttacttt ttgacgattt tttgaaagga gggaagagga aatga                  1245

SEQ ID NO: 18          moltype = DNA  length = 1803
```

-continued

```
FEATURE                Location/Qualifiers
source                 1..1803
                       mol_type = genomic DNA
                       organism = Lactococcus lactis
SEQUENCE: 18
atggatgaag tgaaagaatt cacatcaaaa caatttttta atactttact tactcttcca  60
agcaccttga agttaatttt tcagttggaa aaacgttatg caatttattt aattgtgcta  120
aatgctatca cagcttttgt tccgttggct agtcttttta tttatcaaga tttaataaac  180
tctgtgctag gttcagggag acatcttatc aatattatta tcatctattt tattgttcaa  240
gtgataacaa cagttctggg acagctggaa agttatgtta gtggaaaatt tgatatgcga  300
ctttcttaca gtatcaatat gcgcctcatg aggactacct catctcttga attaagtgat  360
tatgagcagg ctgatatgta taatatcata gaaaaagtta ctcaagacag cacttacaag  420
ccttttcagc tatttaatgc tatcattgtt gtgctttcat cgtttatctc attgttatct  480
agtctatttt ttattggaac atggaacatt ggggtagcaa ttttactcct tattgttcca  540
gtattatctt tggtactttt tctcagagtg ggacaattag agtttttaat ccagtggcag  600
agagcaagtt ctgaaagaga aacatggtat attgtatatt tattgactca tgatttttca  660
tttaaagaaa tcaagttaaa taatattagc aattacttca ttcataaatt tggaaaatta  720
aagaaaggat ttatcaacca agatttagct attgctcgta agaagacata tttcaatatt  780
tttcttgatt tcattttgaa tttgataaat attcttacga tatttgctat gatcctttcg  840
gtaagagcag gaaaacttct tataggtaat ttggtaagtc tcatacaagc tatttctaaa  900
atcaatactt attctcaaac aatgattcaa aatatttaca tcatttataa tactagtttg  960
tttatggaac aactttttga gtttttaaag agagaaagtg tagttcacaa aaaaatagaa  1020
gatactgaaa tatgcaatca acatatagga actgttaaag taattaattt atcatatgtt  1080
taccctaatt cgaatgcctt tgcactaaag aatatcaatt tatcctttga aaaaggagaa  1140
ttaactgcta ttgtaggaaa aaatggttca gggaaaagta cactagtaaa gataatttca  1200
ggattatatc aaccaactat gggaataatc caatacgaca aaatgagaag tagtttgatg  1260
cctgaggagt tttatcagaa aaacatatcg gtgctgttcc aagattttgt gaagtatgag  1320
ttaacgataa gagagaatat aggattgagt gatttgtctt ctcaatggga agatgagaaa  1380
attattaaag tactagataa tttaggactc gatttttttga aaactaataa tcaatatgta  1440
cttgatacgc agttaggaaa ttggtttcaa gaagggcatc aactttcagg aggtcagtgg  1500
caaaaaattg cattagcaag gacattcttt aagaaagctt caatttatat tttagatgaa  1560
ccaagtgctg cactcgatcc tgtagctgaa aaagaaatat ttgattattt tgttgctctt  1620
tcggaaaata atatttcaat tttcatttct catagtttga atgctgccag aaaagcaaat  1680
aaaatcgtgg ttatgaaaga tggacaggtc gaagatgttg gaagtcatga tgtccttctg  1740
agaagatgtc aatactatca agaactttat tattcagagc aatatgagga taatgatgaa  1800
taa                                                                1803

SEQ ID NO: 19          moltype = DNA  length = 2982
FEATURE                Location/Qualifiers
source                 1..2982
                       mol_type = genomic DNA
                       organism = Lactococcus lactis
SEQUENCE: 19
atgataaaaa gttcatttaa agctcaaccg tttttagtaa gaaatacaat tttatctcca  60
aacgataaac ggagttttac tgaatatact caagtcattg agactgtaag taaaaataaa  120
gttttttttgg aacagttact actagctaat cctaaactct atgatgttat gcagaaatat  180
aatgctggtc tgttaaagaa gaaaagggtt aaaaaaatat ttgaatctat ttacaagtat  240
tataagagaa gttatttacg atcaactcca tttggattat ttagtgaaac ttcaattggt  300
gttttttcga aaagttcaca gtacaagtta atgggaaaga ctacaaaggg tataagattg  360
gatactcagt ggttgattcg cctagttcat aaaatggaag tagatttctc aaaaaagtta  420
tcatttacta gaaataatgc aaattataag tttggagatc gagtttttca agtttatacc  480
ataaatagta gtgagcttga agaagtaaat attaaatata cgaatgttta tcaaattatt  540
tctgaatttt gtgagaatga ctatcaaaaa tatgaagata tttgtgaaac tgtaacgctt  600
tgctatggag acgaatatag agaactatcg gaacaatatc ttggtagtct gatagttaat  660
cattatttga tctctaattt acaaaaagat ttgttgtcag atttttcttg gaacactttt  720
ttgactaaag ttgaagcaat agatgaagat aaaaaatata taattcctct gaaaaaagtt  780
caaaagttta ttcaagaata ctcagaaata gaaattggtg aaggtattga gaaactgaaa  840
gaaatatatc aggaaatgtc acaaattctt gagaatgata attatattca aattgattta  900
attagtgata gtgaaataaa ttttgatgtt aaacaaaagc aacaattaga acatttagct  960
gagtttttag gaaatacgac aaaatctgta agaagaacat atttggatga ctataaggat  1020
aaatttatcg aaaaatatgg tgtagatcaa gaagtacaaa taacagaatt atttgattct  1080
acatttggca taggagctcc atataattat aatcatcctc gaaatgactt ttatgagtcc  1140
gaaccgagta ctctatacta ttcagaagag gagagagaaa agtacctcag catgtatgta  1200
gaagccgtta aaaatcataa tgtaattaat cttgacgact tagagtctca ttatcaaaaa  1260
atggacttag aaaagaaaag tgaacttcaa gggttagaat tatttttgaa tttggcaaag  1320
gagtatgaaa aagatatttt tattttaggg gatatcgttg gaaataataa tttgggaggg  1380
gcatcaggta gattttctgc actctctccg gagttaacaa gttatcatag aacgatagta  1440
gattctgtcg aaagagaaaa tgagaataaa gaaattacat cgtgtgaaat agtatttctt  1500
ccagaaaata tcagacatgc taacgttatg catacatcaa ttatgaggag gaaagtactt  1560
ccattttttta caagtacaag tcacaatgaa gttctgttaa ctaatatcta tattggaata  1620
gacgaaaaag aaaaatttta tgcacgagac atttcaactc aagaggtatt gaaattctac  1680
attacaagca tgtacaataa aacgttattc agtaatgagc taagatttct ttacgaaatt  1740
tcattagatg acaagtttgg taatttacct tgggaactta tttacagaga ctttgattat  1800
attccacgtt tagtatttga cgaaatagta atatctcctg ctaaatggaa aatttgggga  1860
agggatgtaa atagtaagat gacaataaga gaacttattc aaagcaaaga aattcccaaa  1920
gagttttata ttgtcaatgg agataataaa gtttatttat cacaggaaaa cccattggat  1980
atggaaattt tagagtcggc gataaagaag agctcaaaaa gaaaagattt tatagagcta  2040
caagaatatt ttgaagatga aaatatcata aataaaggag aaaaggggag agttgccgat  2100
gttgtagtgc cttttattag aacgagagca ttaggtaatg aagggagagc atttataaga  2160
```

```
gagaaaagag tttcggttga acggcgtgaa aaattgccct ttaacgagtg gctttatcta  2220
aagttgtaca tttctataaa tcgtcaaaat gaatttttac tgtcgtatct tccagatatt  2280
cagaaaatag tagcaaacct gggtggaaat ctattcttcc taagatatac tgatcctaaa  2340
ccacatatta gattgcgtat aaaatgttca gatttatttt tagcttacgg atctattctt  2400
gaaatcttaa aaaggagtcg gaaaaatagg ataatgtcaa cttttgatat ttctatttat  2460
gatcaagaag tagaaagata tggtggattt gatactttag agttatccga agcaatattt  2520
tgtgccgatt ctaaaattat tccaaatttg cttacattga taaaagatac taataatgat  2580
tggaaagtcg atgatgtatc aatcttggtg aattatttat atctgaaatg cttctttcag  2640
aatgataaca aaaagattct taattttttg aatttagtta gtcctaaaaa ggttaaagaa  2700
aatgtcaatg aaaagattga acattatctt aagcttctga aagttaataa tctaggtgac  2760
caaatttttt atgacaagaa ttttaaagaa ttaaagcatg ccataaaaaa tttattttta  2820
aaaatgatag ctcaagattt tgaacttcag aaagtttatt caattattga cagtatcatt  2880
catgtccata ataaccgact aattggtatt gaacgagata aagagaaatt aatttattac  2940
acacttcaaa ggttgtttgt ttcggaagaa tacatgaaat ga                     2982

SEQ ID NO: 20          moltype = AA  length = 57
FEATURE                Location/Qualifiers
source                 1..57
                       mol_type = protein
                       organism = Lactococcus lactis
SEQUENCE: 20
MSTKDFNLDL VSVSKKDSGA SPRITSISLC TPGCKTGALM GCNMKTATCH CSIHVSK     57

SEQ ID NO: 21          moltype = DNA  length = 318
FEATURE                Location/Qualifiers
source                 1..318
                       mol_type = genomic DNA
                       organism = Lactococcus lactis
SEQUENCE: 21
atgaatgatt tattttatca tcggctaaag gaactagttg aatcaagtgg taaatctgca  60
aatcaaatag aaagggaatt gggttaccct agaaattctt tgaataatta taagttggga  120
ggagaaccct ctgggacaag attaatagga ctatcagagt attttaatgt gtctccaaaa  180
tatctgatgg gtataattga tgagcctaat gacagttctg caattaatct ttttaaaact  240
ctaactcaag aagagaaaaa agaaatgttt ataatttgtc aaaaatggct ttttttagaa  300
tatcaaatag agttataa                                                318

SEQ ID NO: 22          moltype = DNA  length = 768
FEATURE                Location/Qualifiers
source                 1..768
                       mol_type = genomic DNA
                       organism = Lactococcus lactis
SEQUENCE: 22
atgatgaaaa aaggaatttt tgtaattact atagtgatat ctatagcatt gataattgga  60
ggtttttata gttataattc taggataaat aatctttcaa aagctgataa aggaaaagaa  120
gttgtaaaaa atagcagtga aaaaaatcag atagacctta cctataaaaa gtattataaa  180
aatttaccaa aatcagttca aaataaaata gatgatattt catccaaaaa taaagaagtt  240
actttaactt gtatttggca atctgattca gttatttctg aacaatttca acaaaactta  300
caaaaatatt atggaaataa gttttggaac atcaaaaata tcacttacaa tggcgaaact  360
agtgaacaat tattggctga aaaagttgaa aaccaagtat tagccactaa tcctgatgtt  420
gttttatatg aagctccact ttttaatgat aaccaaaaca ttgaagcaac agcctcactg  480
actagtaatg agcaacttat aacaaatttg gctagtgcag gagcggaggt aatagttcaa  540
ccctctccac cgatttatgg tggtgttgtg taccccgtac aagaagaaca gtttaaacaa  600
tctttatcta caaagtatcc ctatatagac tactgggcta gttacccaga caaaaattct  660
gatgaaatga aggggctgtt ttctgatgat ggagtatata gaacattaaa tgcttcgggg  720
aataaggttt ggctagatta tattactaaa tattttacag caaactaa              768

SEQ ID NO: 23          moltype = DNA  length = 780
FEATURE                Location/Qualifiers
source                 1..780
                       mol_type = genomic DNA
                       organism = Lactococcus lactis
SEQUENCE: 23
atgcaggaaa cacaggaaca gacgattgat ttaagaggga tttttaaaat tattcgcaaa  60
aggttaggtt taatattatt tagtgcttta atagtcacaa tattagggag catctacaca  120
ttttttatag cctccccagt ttacacagcc tcaactcaac ttgtcgttaa actaccaaat  180
tcggataatt cagcagccta cgctggacaa gtgaccggga atattcaaat ggcgaacaca  240
attaaccaag ttattgttag tccagtcatt ttagataaag ttcaaagtaa tttaaatcta  300
tctgatgact ctttccaaaa acaagttaca gcagcaaatc aaacaaattc acaagttatt  360
acgcttactg ttaaatattc taatccttac attgcacaaa agattgcaga cgagactgct  420
aaaatattta gttcagacgc accgaaacta ttgaatgtta ctaacgttaa tattctatcc  480
aaagcaaaag ctcaaacaac accaattagt cctaaaccta aattgtattt agcgatatct  540
gttatagtcg gactagtttt aggtttagcc attgctttat tgaaagaatt gtttgataac  600
aaaattaata aagaagaaga tattgaagct ctggggctca cggttcttgg tgtaacaacc  660
tatgctcaaa tgagtgattt taataagaat acaaataaaa atggcacgca atcgggaact  720
aagtcaagtc cgcctagcga ccatgaagta aatagatcat caaaaaggaa taaaagatag  780

SEQ ID NO: 24          moltype = DNA  length = 696
FEATURE                Location/Qualifiers
source                 1..696
```

```
                        mol_type = genomic DNA
                        organism = Lactococcus lactis
SEQUENCE: 24
atggctaaaa ataaaagaag catagacaac aatcgttata ttattaccag tgtcaatcct  60
caatcaccta tttctgaaca atatcgtacg attcgtacga ccattgattt taaaatggcg  120
gatcaaggga ttaaaagttt tctagtaaca tcttcagaag cagctgcagg taaatcaacc  180
gcgagtgcta atatagctgt tgcttttgca caacaaggta aaaaagtact tttaattgat  240
ggtgatcttc gtaaaccgac tgttaacatt acttttaaag tacaaaatag agtagggtta  300
accaatattt taatgcatca atcttcgatt gaagatgcca tacaagggac aagacttttct  360
gaaaatctta caataattac ctctggtcca attccaccta atccatcgga attattagca  420
tctagtgcaa tgaagaattt gattgactct gtgtccgatt tctttgatgt tgttttgatt  480
gatactccac ctctctctgc agttactgat gctcaaattt tgagtagtta tgtaggagga  540
gtggttcttg ttgtacgtgc ctatgaaaca aaaaaagaga gtttagcaaa aacaaaaaaa  600
atgctggaac aagttaatgc aaatatttta ggagttgttt tgcatggggt agactcttct  660
gactcaccgt cgtattacta ctacggagta gagtaa                            696

SEQ ID NO: 25           moltype = DNA  length = 687
FEATURE                 Location/Qualifiers
source                  1..687
                        mol_type = genomic DNA
                        organism = Lactococcus lactis
SEQUENCE: 25
atggaatttt ttgaggatgc ctcatcacct gaatcggaag agcctaagtt agtagaatta  60
aaaaattttt cttatagaga gctaattata aaaagagcaa ttgatatcct aggaggatta  120
gcaggttcag ttttatttct tattgcggct gcattgcttt atgtgcctta caaaatgagc  180
tcaaaaaaag atcaagggcc aatgttctat aaacaaaaac ggtatggaaa aaacggtaaa  240
attttttata ttttgaaatt tagaacaatg attcttaatg ccgagcagta tctagaactt  300
aatccagatg ttaaagctgc ttaccatgcc aacggcaata agctagaaaa cgatccacgg  360
gtaacgaaga ttggctcatt tataagacga cactcaattg atgaactgcc acaatttatc  420
aatgttctta aaggggatat ggcattggtt ggcccaagac caattttgct ttttgaagcg  480
aaagaatatg gggagcgcct ctcttactta ctcatgtgta aacctggaat tactggttat  540
tggacaacac atggtcgaag taaagttctt tttcctcaac gagcagattt agaactctat  600
tacctccagt accatagtac caaaaacgat atcaagcttc tagtactcac aattgtacaa  660
agtattaacg gatcggacgc atattaa                                      687

SEQ ID NO: 26           moltype = DNA  length = 765
FEATURE                 Location/Qualifiers
source                  1..765
                        mol_type = genomic DNA
                        organism = Lactococcus lactis
SEQUENCE: 26
atgattgata ttcattgcca tattttaccg ggtatagatg atggagctaa aacttctgga  60
gatactctga caatgctgaa atcagcaatt gatgaaggga taacaactat cactgctact  120
cctcatcata atcctcaatt taataatgaa tcaccactta ttttgaaaaa agttaaggaa  180
gttcaaaata tcattgacga acatcaatta ccaattgaag ttttacccgg acaagaggtg  240
agaatatatg gtgatttatt aaaagaattt tctgaaggaa agttactgac agcagcgggc  300
acttcaagtt atatattgat tgaatttcca tcaaatcatg tgccagctta tgctaaagaa  360
ctttttttata atattcaatt ggagggactt caacctattt tggtccaccc tgagcgtaat  420
agcggaatca ttgagaaccc tgatatatta tttgatttta ttgaacaagg agtactaagt  480
cagataacag cttcaagtgt cactggtcat tttggtaaaa aaatacaaaa gctgtcattt  540
aaaatgatag aaaaccatct tacgcatttt gttgcatcag atgcgcataa tgtgacgtca  600
cgtgcattta agatgaagga agcgtttgaa attattgaag atagttatgg ttctgatgta  660
tcacgaatgt ttcaaaataa tgcagagtca gtgattttaa acgaaagttt ttatcaagaa  720
aaaccaacaa agatcaaaac aaagaaattt ttaggattat tttaa                  765

SEQ ID NO: 27           moltype = DNA  length = 450
FEATURE                 Location/Qualifiers
source                  1..450
                        mol_type = genomic DNA
                        organism = Lactococcus lactis
SEQUENCE: 27
atgaaaatag cattagtagg ttccagcggt ggccatttga cacacctgta tttgttaaaa  60
aagttttggg aaaacgaaga tagattttgg gtcacatttg ataaagcaga tgcaaaatct  120
atattgaaag aagaaagatt ttatccttgt tattatccca caaatagaaa tgtaaaaaac  180
acgataaaaa ataccattct tgcatttaaa atacttagaa aagaaaaacc agatttgatt  240
atttcgagtg gtgctgcggt agccgttcct ttttttggt taggtaaact attcggtgca  300
aagacagtct atattgaaat atttgaccgg atcgataaac caaccttaac aggaaaatta  360
gtttatccag ttactgataa gtttatagtt caatgggaag agttaaaaaa agtttaccct  420
aaagcaatta atttaggagg aattttctaa                                  450

SEQ ID NO: 28           moltype = DNA  length = 507
FEATURE                 Location/Qualifiers
source                  1..507
                        mol_type = genomic DNA
                        organism = Lactococcus lactis
SEQUENCE: 28
atgatttttg taacggttgg aactcacgaa caaccattta atcgactcat tcaaaaaatt  60
gatgaacttg tacgcgatgg tgaaatcgaa gacgatgtat tcatgcaaat tgggtactca  120
acttatgaac ccaaatatac taaatgggaa aaggttattg gatatgagac tatggaaaga  180
```

```
tgtatgaatg aagcgagtac gattattact catggcggac catctaccta tatgcaagta  240
ttacaactag gtaaaattcc gatagttgtt ccacggcaaa tgaaatttga tgagcatata  300
aatgatcatc aaatttgggt aagtaaacag gttgtgaaaa agggatactc attgattttg  360
tgcgaagatg ttgaagacat tctcgaaaat attattagct ccaaaatttc agatacctta  420
caaaaaaatg taaatcacaa cactgaattc ataaaattat tcagtgctga aatttaccag  480
ctatttataa aaagtgagaa gatatga                                      507

SEQ ID NO: 29          moltype = DNA  length = 987
FEATURE                Location/Qualifiers
source                 1..987
                       mol_type = genomic DNA
                       organism = Lactococcus lactis
SEQUENCE: 29
atggttaaat tttctataat tattccagta tataacttag aagattattt atatcgctgt  60
ttagaatctg ttctcaatca agattataat gattttgaga ttatacttat taatgatggt  120
tcagatgata attcacttaa tattatcgaa gaatttaaaa atcaatattc tagtaaaata  180
aaagtaattt ctcaagtgaa tcaaggagta tcatcagcaa gaaataaggg acttcaagaa  240
gctgaagggg agtatataat ttttatagat ggggatgact acattgatag taatcattta  300
agtaatattc ttgaatatat aggaaaatca aaaaattcct ttattctaaa tagtctattt  360
gtagagaccg gggaaactac ttgggttatt cccaaagcaa gtaagaatta tgattgtagt  420
ttttatggaa ctcttatgaa tattttagat aatcatagat atcaaggctt tttgtttaat  480
aaaatattta gtaattcagt aataaaaagt aatgaattga agtttaaaga aaatttatat  540
tatgcggaag atacggagtt tgttattcga taccttttgg agttgcaaaa gagagaatcg  600
gatttagttg ctaatataat taattctcca acatatcatt atgttcaaat aaaaagtagt  660
gctactcacc aatttaatat cagacaattt tctctagtaa attctatgga ggaaattcaa  720
tgtaatctag aaaaaatgaa atcaataaat aaagaagttt tgtatgtagt acaatcaaat  780
ttaattcagt cagtattgaa aatgataaga ttatctagaa taaatggtgt agttaatgaa  840
catttggaag attcattaga taaaatcgta acaaattcat gggataatat tgaaactatc  900
tggaaatctc aaagaaagat ttactctaag gtatttttaa cactaagaat tattcaggaa  960
aaagttaagg gtaagaaaat caaatag                                      987

SEQ ID NO: 30          moltype = DNA  length = 867
FEATURE                Location/Qualifiers
source                 1..867
                       mol_type = genomic DNA
                       organism = Lactococcus lactis
SEQUENCE: 30
gtgataatta tacctatctt aatttttatt acccttatag gagcaggggc ttatgcctta  60
agagattcac ttattcctac tgaacatacg aaaacaaata gttcggatca accgaccaaa  120
acttcggttt ctaacggtta cgtggagcaa aaaggtgaag aagctgctgt gggtagtata  180
gcacttgtag atgacgctgg agtaccagaa tgggttaaag ttccctcaaa ggtaaattta  240
gataaattta ctgatttatc tacgaataat atcactattt atcgaattaa caatccggaa  300
gtcttaaaaa cagttaccga tcgtacggat caacggatga aaatgtcaga agttatagct  360
aagtatccta atactttgat tatgaatgct tccgcttttg atatgcagac aggacaagta  420
gctggatttc aaattaataa tggaaagttg attcaagact ggagtccagg tacaacgact  480
cagtatgctt ttgttattaa caaagatggt tcgtgcaaaa tttatgattc aagtacacct  540
gcttcaacta ttattaaaaa cggagggcaa caagcctatg attttggtac tgcaattatc  600
cgtgatggta aaattcaacc aagtgatggc tcagtagatt ggaagatcca tatttttatt  660
gcgaatgata aagataataa tctctatgct attttgagtg atacaaatgc aggttatgat  720
aatataatga aatcagtgtc aaatttgaag ctccaaaata tgttattact tgatagtggt  780
ggttcaagtc aactatctgt caatggtaaa acgattgttg ctagtcaaga tgatcgagcc  840
gtaccggatt atattgtgat gaaataa                                      867

SEQ ID NO: 31          moltype = DNA  length = 903
FEATURE                Location/Qualifiers
source                 1..903
                       mol_type = genomic DNA
                       organism = Lactococcus lactis
SEQUENCE: 31
atgaatcaaa aaaagaggcg tcattatcgt aagaaaaaat acacagtact aaaagttatt  60
tcaattattt ttgtattagt aattatttct gttgcttcta tagcctacgt agcttataga  120
aatgttgaat caaccttttc aacatcatat gaaaatttcc ctaaaacaac aagtattgac  180
ttaaaaaaat ctaaaacatt caccacactt atcattgcaa ctggtaaaaa taattctaaa  240
aattcagctt atgctactgt tttagcttca acgaatgtaa agacaaatca aactactttc  300
atgaacttcc cagtttttgc gacactgcct aatcaaaaaa caatcactga agtttacaat  360
acgaatggag atgatggaat tttccagatg gttaaagacc tattgaatgc gtccattaac  420
aaagtaattc agatcgatgt taataaaatg ggatcacttg tacaggccac tggtggaatc  480
accatgcaaa atccaaaggc attcaatgct gaaggttatg agtttaaaca aggaactgtt  540
aatttacaaa ctgctgatca agtccaagcc tatatgacac aaattgacga tactgatttg  600
gatgcttcaa tcactcggat tcaaaatgtc tcaatggaac tctacgtaaa tattaaaaaa  660
attgctcata tgaaaaaact tgaaagtttc aattactatc gagaaattct ctatgctttt  720
tcaaacactg ttaaaaccaa tataagtttc aatgatgcta aaacgatcgt tatgagctac  780
agtaaggctc taaagaatac cagcaagctc aatctacata caacagatga aaatggagct  840
aaggtcgttt ctcaaacaga attagactca gtcaaaaccc tttttgaaaa atctctaaaa  900
taa                                                                903

SEQ ID NO: 32          moltype = DNA  length = 1431
FEATURE                Location/Qualifiers
source                 1..1431
```

-continued

```
                        mol_type = genomic DNA
                        organism = Lactococcus lactis
SEQUENCE: 32
ttgagtaaca caggaataaa agtaactaat aaccaaatac taataagaaa agtaacagtt  60
atatttttgc tttttcagg aatttgggta ggagctgcaa caagtttttt tgagatttct  120
ttagtgtttt ctgtattagc tggtattata agctcaaatt tactagaaaa tgaatttgtt  180
ccgtattcag ttattttaat actggttttt caaaatttat tgataggtac tgggtctcat  240
ttaacaggga atctgtcagg tttaacttat ctcactcaag ttccgatggt ttttgtttgg  300
actattaatc tctgtttgaa aaaggtagat aaattatcta aagttgatat ttcttttata  360
gttcttatga tattttcttt gtcatctttg gcatttggac gagggccaat tcaggcaatt  420
atttcgaact taagagattt atcgacattt tattttactt atcgtatagg taaaagattt  480
atcaaaactg aagaaatatt tgcgaggttt ataaagaaaa ttctttattt aggaatattt  540
gtagttttaa ttggtattat cttatactta ggaggctatc ctctaaacaa atttttggga  600
atagatgaaa tttactacgc taagggggta actactttac ttaataattt tgatggcaga  660
tttggatcag atgtatttgg aatttccgta acacgtatgg gatcaattta ttttgaacca  720
ataaatttgg ggtatttaat attttctatg ctcattatat cctttatttt ctttaatacc  780
caaaaattaa aatatataaa tttatataga ctgattttat tgataggtgg aatgttaact  840
tttgggaaag gtgctatgct tctagctata ggggtgatgg ttgcaggtat cggacataaa  900
ttatttttaa aattcttttc aagaagtaat gaaatgaatg tttttagaaa tctttttata  960
ttgttaacta ttattatgtt tattggtgga aattattatt tcaaaacttt tggaggagct  1020
gtagggaatc acttttatgc aatccaaggg acattggata gtataagtca tcgaccaatt  1080
ggttttggat taggtgtggg aggaaacgcc tcagcagtat ttacaggggg agaacttgat  1140
tttactactg gatcagaaac agccttgtta tcatttgtat accaaatagg tgtacaaggt  1200
gctattgctt taatatgtgt attctacttt atgagtaaag aagtgttgga aaaagtacag  1260
aagaattcac aattcaaaaa tagattttta ttttatgttc caatgatatt gatttttgtt  1320
agtatatatc aagctaatac atataccccca caatgtataa cgttgttaat gattactttg  1380
ggaggatttg taggaatgag agacaggaga aggaaaaaat ataatggtta a           1431

SEQ ID NO: 33           moltype = DNA  length = 702
FEATURE                 Location/Qualifiers
source                  1..702
                        mol_type = genomic DNA
                        organism = Lactococcus lactis
SEQUENCE: 33
atgataccaa aagtaataca ctattgctgg ttcggagggc aacctttacc agaatctgcg  60
ctaaaatgta ttgaaagttg gagaaggttt tgtccagatt atgaaataaa acaatggtct  120
gagaaaaact atgatgtaaa taaaattcaa tatacaaaag aagcgtacga aaagaaacgt  180
tatgcttttg tcacggatgt tgcaaggctt gatatcattt atagtgaggg gggcatttat  240
cttgacactg atgttgaact gataaaacct ttggatgatt tgcttgtcaa tcaagcatat  300
atgggaatgg aaactgctgg tcgtgtaaat accggccaag gatttggagc tataaaaaac  360
caccaaatag ttaaagcaaa tttagaggtt tatgctgaac ttgagtttga tggtacgact  420
acttgtgtga cttacacaac taatttgtta aaaagatttg gtttacaaaa aaaagatatt  480
aaccaggatt tacaaggaat aactatcctt ccgacagatt atttatgtcc attaagtctt  540
gaaactagga aattagtaat tacagaaaat acattttcta ttcatcacta tgatggtggt  600
tggaaaaaag gaaaagataa atttttatct ctaaaaatta aaattcgacg ctggattggt  660
gataactttt atgagtcgat aaaaacgaag ttgaagggat ag                     702
```

PROCESSED CHEESE WITH CULTURED DAIRY COMPONENTS AND METHOD OF MANUFACTURING

CROSS-REFERENCE TO RELATED APPLICATIONS

This application is a continuation of U.S. application Ser. No. 16/536,494, filed Aug. 9, 2019, now U.S. Pat. No. 11,464,238, which is a divisional of U.S. application Ser. No. 13/973,660, filed Aug. 22, 2013, now U.S. Pat. No. 10,375,972, which claims the benefit of U.S. Provisional Application No. 61/692,129, filed Aug. 22, 2012, which are hereby incorporated herein by reference in their entireties.

SUBMISSION OF SEQUENCE LISTING

The Sequence Listing associated with this application is filed in electronic format as an XML file on Oct. 11, 2022 and is hereby incorporated into the specification in its entirety. The name of the XML file containing the Sequence Listing is "155285 Sequence Listing.xml." The size of the XML file is 64 KB and the XML file was created on Oct. 11, 2022.

FIELD

The present application generally relates to processed cheese compositions and methods for manufacture, and more particularly, processed cheese compositions containing cultured dairy components.

BACKGROUND

Processed cheese, widely available in sliced and loaf forms, has become one of the more popular selling cheese products. Processed cheese products are particularly popular with children. Processed cheese is conventionally prepared by heating, grinding and/or mixing one or more varieties of milk-fat containing natural cheeses, such as, for example, Cheddar cheese, Colby cheese, Swiss cheese, Brick cheese, Muenster cheese, pasta filata cheese, washed curd, and granular curd cheese to suggest but a few types. The resulting cheese is then blended with other dairy products, such as non-fat dry milk and whey solids, and emulsifying salts, such as disodium phosphate, at temperatures which are sufficiently elevated to pasteurize the cheese and to produce a homogeneous, pumpable, fluid cheese material that may be formed into sheets, slices, or other desired forms.

It is often desirable to prolong the shelf life of food, such as processed cheese, and/or increase microbiological stability of such food. By increasing the amount of time a food is stable, processors can mitigate inventory losses due to spoiled foodstuffs. Prior methods, such as the use of packaging, preservatives, and/or specific storage parameters (e.g., refrigeration), have been used to stave off spoilage.

In particular, *Listeria monocytogenes* and *C. botulinum* can, in some instances, be a concern with foods like as raw milk, cheeses (particularly soft-ripened varieties), ice cream, raw vegetables, fermented raw meat sausages, raw and cooked poultry, raw meats (of all types), and raw and smoked fish. The ability of these pathogens to grow, in some instances, at temperatures as low as 3° C. permits multiplication in refrigerated foods.

Furthermore, while it is desired to provide improved shelf life to foods, such as processed cheese, there also has been an increased desire to provide foods that contain an increased amount of natural ingredients. In this regard, it may be desirable to provide foods which include only natural ingredients or otherwise remove artificial materials. For example, processed cheese oftentimes utilizes preservatives such as sorbic acid to improve food safety and shelf life. It may be desirable to incorporate natural preservatives and/or antimicrobials while maintaining and/or improving the characteristics of the processed cheese.

SUMMARY

In one approach, a processed cheese including natural antimicrobials is provided herein. In one aspect of this approach, the processed cheese includes about 10 to about 90 percent natural cheese or a mixture of natural cheeses; one or more optional emulsifiers; about 8 to about 25 percent protein; and about 10 to about 30 percent fat. The processed cheese also includes an amount of nisin, effective to prevent toxin formation from *C. botulinum* determined by toxin bioassay with mice, in the processed cheese at the protein and the fat levels thereof for about 9 days at 86° F. At the same time, the processed cheese also includes an amount of exopolysaccharide effective to increase the melt of the processed cheese and increase the firmness of the processed cheese relative to a processed cheese without nisin and exopolysaccharide. In some approaches, the nisin includes nisin A.

The nisin and exopolysaccharide of the processed cheese may also be included in the processed cheese in the form of a cultured dairy component, which may be provided in about 1 to about 20 percent in the processed cheese. The nisin and the exopolysaccharide in the cultured dairy component may also be obtained from a fermentation of a single bacterial strain in a liquid dairy medium, where the bacterial strain is an isolated *Lactococcus lactis* strain having all of the identifying characteristics of the *Lactococcus lactis* strain of ATCC PTA-120552.

The processed cheese may include about 1 to about 100 ppm of nisin and about 100 to about 2,000 ppm of the exopolysaccharide, where the nisin and exopolysaccharide may be obtained from a single bacterial strain, where the bacterial strain is an isolated *Lactococcus lactis* strain having all of the identifying characteristics of the *Lactococcus lactis* strain of ATCC PTA-120552.

The fermentation of the bacterial strain ATCC PTA-120552 may be conducted in a 2× to a 5× concentrated liquid dairy medium at a temperature of about 25 to about 35° C. and a pH of about 5 to about 6 for about 15 to about 48 hours. The concentrated liquid dairy medium may be a concentrated milk having a total solids of about 5 to about 36 percent, about 1 to about 14 percent protein, and about 0 to about 16 percent fat.

In some approaches, the processed cheese is free of artificial preservatives selected from the group consisting of sorbic acid, potassium sorbate, nitrites, and combinations thereof.

In some approaches, the processed cheese includes nisin A and a bacterial strain having at least one gene from a nisin producing gene cluster with significant homology to the sequences selected from the group consisting of SEQ ID NOS 9 to 19 and at least one gene from an exopolysaccharide producing gene cluster with significant homology to the sequences selected from the group consisting of SEQ ID NOS 21 to 33. In some approaches, the at least one gene from a nisin producing gene cluster and the at least one gene from the exopolysaccharide producing gene cluster are from the same bacterial strain, where the bacterial strain may be an isolated *Lactococcus lactis* strain having all of the identifying characteristics of the *Lactococcus lactis* strain of ATCC PTA-120552. The bacterial strain incorporated into the processed cheese product may not be viable due to heat treatment steps in either the process for preparing the cultured dairy component or processed cheese product.

In other aspects, a method of producing a processed cheese having natural antimicrobials is provided. In some approaches, the method includes fermenting a liquid dairy medium with a *Lactococcus lactis* strain to produce a cultured dairy component including nisin and exopolysaccharide. The cultured dairy component is then blended with a natural cheese or mixture of natural cheeses and one or more emulsifiers to produce a processed cheese having about 8 to about 25 percent protein and about 10 to about 20 percent fat. The method is effect to produce processed cheese an amount of nisin, effective to prevent toxin formation from *C. botulinum* determined by toxin bioassay with mice, in the processed cheese at the protein and the fat levels thereof for about 9 days at 86° F. The method is also effective to produce processed cheese with an amount of exopolysaccharide effective to increase the melt of the processed cheese and increase the firmness of the processed cheese relative to a processed cheese without nisin and exopolysaccharide. In some approaches, the nisin includes nisin A.

In other approaches, the nisin and the exopolysaccharide in the cultured dairy component of the method are obtained from the fermentation of the same *Lactococcus lactis* strain in the liquid dairy medium. The *Lactococcus lactis* strain may be an isolated *Lactococcus lactis* strain having all of the identifying characteristics of the *Lactococcus lactis* strain of ATCC PTA-120552. The cultured dairy component used in the method may also include about 1 to about 100 ppm of nisin and about 100 to about 2000 ppm of the exopolysaccharide. The processed cheese may include about 1 to about 20 percent of the cultured dairy component.

The method may include the fermentation of the *Lactococcus lactis* strain ATCC PTA-120552 conducted in a 2× to a 5× concentrated liquid dairy medium at a temperature of about 25 to about 35° C. and a pH of about 5 to about 6 for about 15 to about 48 hours. In some approaches, the concentrated liquid dairy medium is a concentrated milk having a total solids of about 5 to about 36 percent, about 1 to about 14 percent protein, and about 0 to about 16 percent fat.

In other approaches, the method is effective so that the processed cheese is free of artificial preservatives selected from the group consisting of sorbic acid, potassium sorbate, nitrites, and mixtures thereof.

In some approaches, the cultured dairy component of the method includes nisin A and a bacterial strain having at least one gene from a nisin producing gene cluster with significant homology to the sequences selected from the group consisting of SEQ ID NOS 9 to 19 and at least one gene from an exopolysaccharide producing gene cluster with significant homology to the sequences selected from the group consisting of SEQ ID NOS 21 to 33.

In other approaches, the at least one gene from a nisin producing gene cluster and the at least one gene from the exopolysaccharide producing gene cluster in the method are from the same *Lactococcus lactis* strain.

BRIEF DESCRIPTION OF THE DRAWINGS

FIG. 10 is a chart showing the results of a comparative Multi Locus Sequence Typing (MLST) analysis of nisin-producing strains;

FIG. 11 is a chart showing the results of phage typing analysis of nisin-producing strains;

FIG. 13 is a chart comparing the EPS-related genes of various lactic acid bacteria;

DETAILED DESCRIPTION

Figure 1:
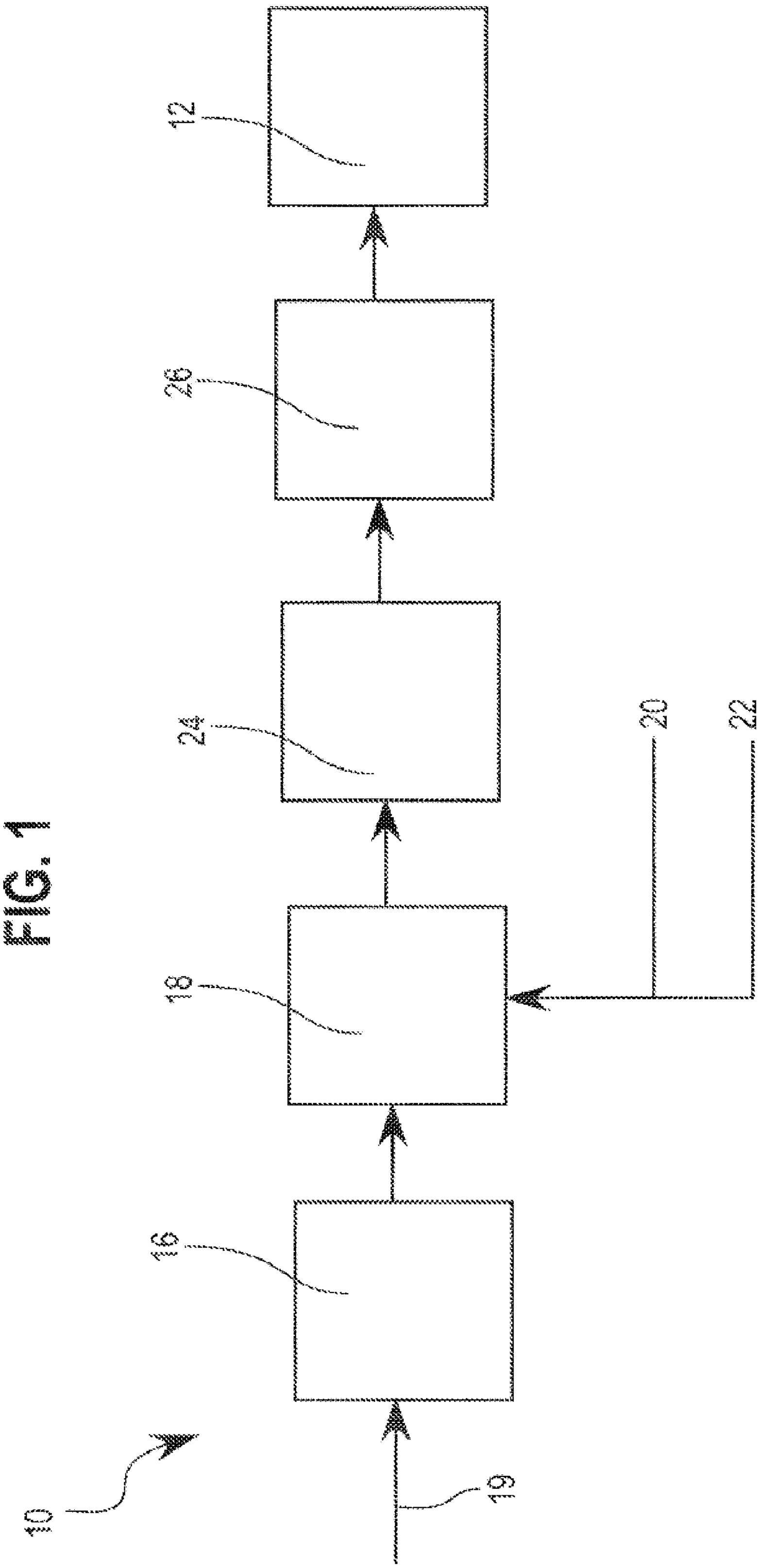
FIG. 1 is a process flow diagram illustrating production of an exemplary cultured dairy component produced from a concentrated dairy liquid.

The present application is generally directed to processed cheese including, among other aspects, natural antimicrobials and natural texture modifying agents. In one form, the natural antimicrobials are incorporated into the processed cheese via cultured dairy components or concentrated cultured dairy components, which include a natural antimicrobial and/or a culture capable of producing a natural antimicrobial under appropriate fermentation conditions. As used herein, the terms "cultured dairy component" or "concentrated cultured dairy component" generally refer to cultured milk substrates or derivatives thereof that have undergone, in some approaches, concentration and fermentation with selected antimicrobial-producing cultures under conditions effective to produce antimicrobials unless specifically identified as not including cultured antimicrobials. As used herein, "natural antimicrobial" refers to a component with antimicrobial activity that is produced by an organism, such as by a bacterial culture during a fermentation process.

In one form, the cultured dairy component includes a dairy substrate fermented with an antimicrobial-producing culture. In some approaches, the dairy substrate is a dairy liquid, such as milk or a concentrated dairy liquid or milk substrate, such as a 2-5× concentrated milk substrate. In one aspect, the antimicrobial-producing culture is a nisin-producing culture. In one particular form, the nisin produced by the culture is nisin A. In one approach, the processed cheeses herein include about 1 to about 100 ppm of nisin, in other approaches, about 1 to about 20 ppm of nisin, in other approaches, about 5 to about 15 ppm of nisin, and in yet other approaches, about 10 to about 15 ppm of nisin.

In some approaches, the cultured dairy component also includes exopolysaccharide (EPS). In one aspect, the EPS is produced during fermentation of the milk substrate under the same conditions and with the same medium used to produce nisin. In another aspect, the EPS is produced by the antimicrobial-producing culture and, in some approaches, from the same bacterial strain used to produce nisin. In this regard, when the cultured dairy component is used in the processed cheeses herein, the processed cheese includes both nisin (such as nisin A) and EPS obtained from the same fermentation, and in some approaches, the same bacterial strain. Along with the nisin discussed above, it is expected that the cultured dairy component includes about 0.1 to about 2 percent of exopolysaccharide, and the final processed cheese includes, in addition to the nisin, about 100 to about 1000 ppm of the exopolysaccharide.

It has been unexpectedly found that a processed cheese including the cultured daily component herein including both natural antimicrobials (such as nisin) and exopolysaccharide from the same fermentation and/or same bacterial strain has improved antimicrobial properties, improved melt performance, and firmer texture as compared to processed cheese with the same formulation except artificial preservatives and/or other types of prior natural anti-microbials. At the same time, the processed cheese herein including the unique cultured dairy component also exhibits a firmness resembling that of natural cheese. It was unexpected that both increased melt properties and increased firmness could be obtained at the same time in a processed cheese. By one approach, the processed cheeses herein exhibit a firmness (Young's modulus) of about 1500 to about 2500 Pa and, at the same time, exhibit a consistency of about 50,000 to about 70,000 Pa/second. In other approaches, the processed cheese with the cultured dairy components also exhibits an increase in melt of about 20 to about 75% over the same processed cheese but without the cultured dairy component or with sorbic acid or other artificial preservative instead of the cultured dairy component. As used herein, natural cheese refers to unpasteurized cheese made by curdling milk or other dairy liquid using some combination of rennet (or rennet substitute) and acidification. The natural cheese used in the processed cheese described herein may be freshly made or aged.

As discussed more below, prior antimicrobials tended to be less effective in the context of a processed cheese with high levels of protein and fat because it was believed that the levels of protein and fat in processed cheese combined, in some cases, with lower moisture levels tended to protect and/or shield various pathogens from being inhibited by commercial forms of nisin and other natural antimicrobials. It was unexpectedly discovered that the natural antimicrobials of the cultured dairy components herein effectively inhibit *C. botulinum* and other pathogens at a level not found by prior natural antimicrobials.

Previously, it was expected that when melt performance of processed cheese was improved, it resulted in a decrease in firmness. That is, it was previously expected there was an inverse relationship between melt and firmness. As mentioned above, the processed cheeses herein, on the other hand, achieve an improvement in both melt and texture/firmness at the same time when the cultured dairy components are used. This double improvement in melt and firmness at the same time tended to be opposite to these trends in previous processed cheese applications.

As described herein, the term activity unit ("AU") may be used to describe the biological activity of the natural antimicrobial in the cultured dairy component and processed cheese in which the antimicrobial is incorporated. It should be understood that biological activity may also be expressed in International Units ("IU") such that AU and IU may be used interchangeably. In some approaches, the cultured dairy components of the present disclosure and the processed cheeses prepared therewith may have nisin activity in the processed cheese of about 40 to about 400 IU/gram and, in other approaches, about 50 to about 200 IU/gram.

One or more different natural antimicrobials may be included in the processed cheese. In one form, the processed cheese contains a sufficient amount of natural antimicrobial such that the processed cheese does not contain or is free of artificial preservatives, such as sorbic acid, potassium sorbate and the like. As used herein, the phrases "does not contain," "is free of" or "substantially free of" mean less than about 0.5%, in other approaches, less than about 0.1% and, in some cases, less than about 0.05% and in other cases, none. In some approaches, the processed cheese includes an amount of natural antimicrobial effective to prevent toxin formation for at least about 9 days when the processed cheese is stored at about 86° F. The processed cheese also includes cultured dairy component in an amount effective to prevent more than 1 log of growth of *Listeria monocytogenes* for at least about 4 weeks, in another aspect at least about 8 weeks, in another aspect at least about 12 weeks, in another aspect at least about 16 weeks, in another aspect at least about 20 weeks, in another aspect at least about 24 weeks, and in yet another aspect at least about 28 weeks, during storage at about 1 to about 10° C.

The natural antimicrobial can be produced by fermentation using an antimicrobial-producing strain of lactic acid bacteria. As used herein, the term "lactic acid bacteria" generally refers to gram-positive bacteria that generate lactic acid as a major metabolite of carbohydrate fermentation. The lactic acid bacteria may be, for example, an antibacterial producing strain of *Lactococcus lactis* or, in alternative approaches, *Brevibacterium linens.*

In some aspects, the natural antimicrobial comprises nisin and, in some approaches, nisin A. Nisin is an inhibitory polycyclic peptide with 34 amino acid residues. It contains the uncommon amino acids lanthionine, methyllanthionine, dehydroalanine and dehydro-amino-butyric acid. These amino acids are synthesized by posttranslational modifications. In these reactions a ribosomally synthesized 57-mer is converted to the final peptide. The unsaturated amino acids originate from serine and threonine.

Nisin can be obtained by culturing nisin-producing bacteria on natural substrates, including milk. Nisin has been included in food products to extend the safe, usable life by suppressing gram-positive spoilage and pathogenic bacteria. Due to its highly selective activity, it may also be employed as a selective agent in microbiological media for the isolation of gram-negative bacteria, yeast and molds. Two commercially available antimicrobials containing nisin are Nisaplin® and Novasin™ (both from Daniso A/S, Denmark). Typically, Nisaplin contains less than about 3.0 weight % nisin, the remainder consisting of NaCl, proteins, carbohydrates and moisture. When referring to a nisin component herein the component may include not only nisin, but also other ingredients, such as carriers, salts, protein, carbohydrates, and metabolites that result from the fermentation process. As shown in the Examples and discussed more below, commercially available sources of nisin do not provide the level of suppression of spoilage and pathogenic bacteria in the context of processed cheese as the cultured dairy components of the present disclosure.

In one aspect, the cultured dairy components made by the methods described herein include nisin A and/or the nisin-producing culture includes a nisin A-producing culture. Nisin A has a molecular weight of about 3,351.5 Da and the amino acid sequence of SEQ ID NO 1. However, it should be understood that other natural antimicrobials may also be utilized. For example, other forms of nisin, including Nisin Z, Nisin Q, Nisin F, and Nisin F, may be included. Other bacteriocins may also be included, such as class I bacteriocins, class II bacteriocins, class III bacteriocins, and class IV bacteriocins. Other natural antimicrobials include naturally produced antifungal agents such as, for example, natamycin (produced by *Streptomyces natalensis*) and polylysine (produced by certain *Streptomyces* species) may also be included.

Further, bacterial strains that produce natural antimicrobials may be provided. Such bacterial strains include, for example, antibacterial-producing strains of lactic acid bacteria, such as for example, nisin-producing strains of *Lactoccocus lactis* or *Brevibacterium linens.*

In one form, the cultured dairy component comprises a nisin component and/or includes a culture capable of producing a nisin component in the range of about 30 to about 90 ppm by weight of the fermentation medium.

The natural antimicrobial can be provided by culturing the antimicrobial-producing bacteria under appropriate fermentation conditions in a dairy substrate. The dairy substrate may include, for example, milk, cream, whey or other dairy-containing powder or liquid. The dairy substrate may also comprise dextrose, corn syrup or other carbohydrates supplemented with other nutrients for bacterial growth, with or without an acid neutralizer such as calcium carbonate.

In some forms, the milk may be in the form of raw milk or a concentrated milk product, such as at least about 2× concentrated milk product, in another aspect up to about 5× concentrated milk product. Typically, the milk base will container greater than about 3 percent lactose and a nitrogen source. The base can be produced from hydrated powders or derived from fresh dairy liquids, such as skim milk, two-percent milk, whole milk, and the like. By one approach, the starting dairy substrate includes concentrated milk having a total solids of about 5 to about 36, a protein content of about 1 to about 14 percent, a fat content of about 0 to about 16 percent, and a moisture content of about 64 to about 95 percent.

When the cultured dairy component is used in production of processed cheese, it has been found to be desirable to maintain a low level of moisture in the dairy substrate to reduce the increased costs associated with removing moisture from the cultured dairy component prior to inclusion in the processed cheese product. Further, certain components of the cultured dairy component may be unstable and may be degraded or otherwise damaged during a moisture removal process. For example, the EPS component of the cultured dairy component is believed to be relatively unstable and may be damaged by moisture removal techniques, such as spray drying, evaporation, and the like. However, the cultured dairy component including cultured antimicrobials may take a variety of forms such as liquid and/or powder, if desired for a particular application.

At least in some approaches, the nisin A and exopolysaccharide-producing culture used herein is *Lactococcus lactis* ss. *lactis* strain 329, On Aug. 21, 2013, strain 329 was deposited at the American Type Culture Collection (ATCC), 10801 University Blvd., Manassas, VA 20110, and given accession number PTA-120552. The deposit was made under the provisions of the Budapest Treaty on the International Recognition of the Deposit of Microorganisms for the Purposes of Patent Procedure.

It has been found that *Lactococcus lactis* strain 329 has a unique genetic and phage profile compared to other raisin-producing strains of lactic acid bacteria. Advantageously, strain 329 also was found to be able to grow in concentrated dairy substrates, including about a 2× to about a 5× milk. It has been found that few cultures are capable of growing in such highly concentrated milk substrates. For example, the cultures herein are effective to grow to at least about $10^9$ CFU/gram in about 10 hours and produce more than about 2000 IU nisin A/gram in about 18 hours even in the about 2× to about 5× concentrated fermentation medium. Strain 329 was characterized using Multi Locus Sequence Typing (MLST), phage typing, and ribotyping as discussed more below.

Multi Locus Sequence Typing (MLST)

The publicly available genome of *L. lactis* subsp. *lactis* IL 1403 (taxid: 272623), also a nisin-producing strain, was used as a template for selection of seven housekeeping genes to be used as genetic markers in a comparison of IL 1403 to strain 329. The selected genes cover a range of loci on the chromosome as detailed in Table 1 below. Each of the seven genes was amplified and sequenced. Sequences were then aligned and compared using IL1403 as the reference. Each sequence variation was accounted for and represents an individual allele.

TABLE 1

| Gene | Protein | Chromosome Location |
|---|---|---|
| acmD (SEQ ID NO 2) | n-acetylmuramidase | 527,413-528,498 |
| gapB (SEQ ID NO 3) | Glyceraldehyde 3 phosphate dehydrogenase | 2,332,466-2,333,476 |
| pdhD (SEQ ID NO 4) | Lipamidedehydrogenase component of pyruvate dehydrogenase | 58,971-60,389 |
| pepC (SEQ ID NO 5) | Aminopeptidase C | 1,947,325-1,948,635 |
| thiE (SEQ ID NO 6) | Thiamine phosphate pyrophosphorylase | 1,293,610-1,294,257 |
| yjjD (SEQ ID NO 7) | ABC transporter permease protein | 993,341-994,963 |
| yyaL (SEQ ID NO 8) | GTP binding protein | 11,119-12,234 |

Phage Typing

Spot plates were used for phage profiling of high titer phage stocks. The phages are identified and the results of the phage typing are presented in FIG. 11.

Ribotyping

Figure 12:
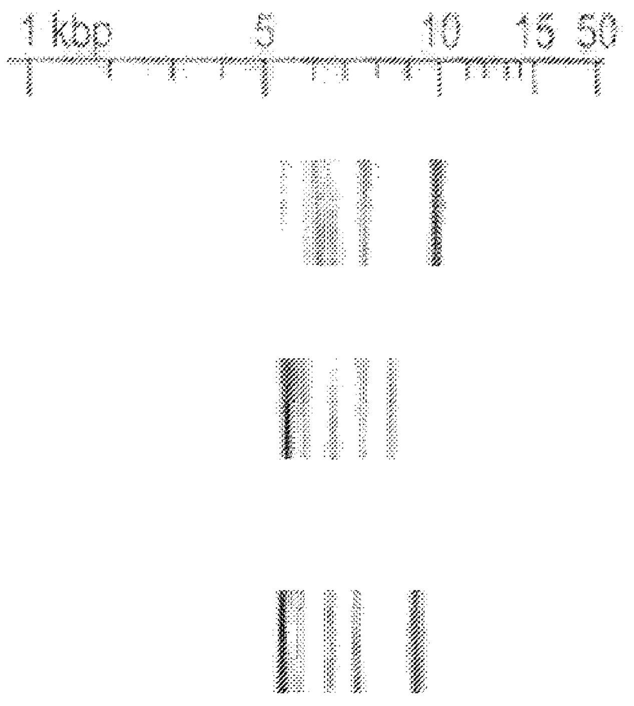
FIG. 12 includes results of Riboprinter analysis of various *Lactococcus lactis* strains.

As used herein, “ribotyping” refers to fingerprinting of genomic DNA restriction fragments containing all or part of the genes coding for the 16S and 23S rRNA. Conventional ribotyping techniques utilizing EcoRI as the restriction enzyme were carried out. The results are shown in FIG. 12. Ribotyping confirmed that *Lactococcus lactis* strain 329 is substantially different from publicly available *Lactococcus lactis* strain ATCC 11454, also a nisin-producing strain.

DNA Sequence Analysis

Figure 14:
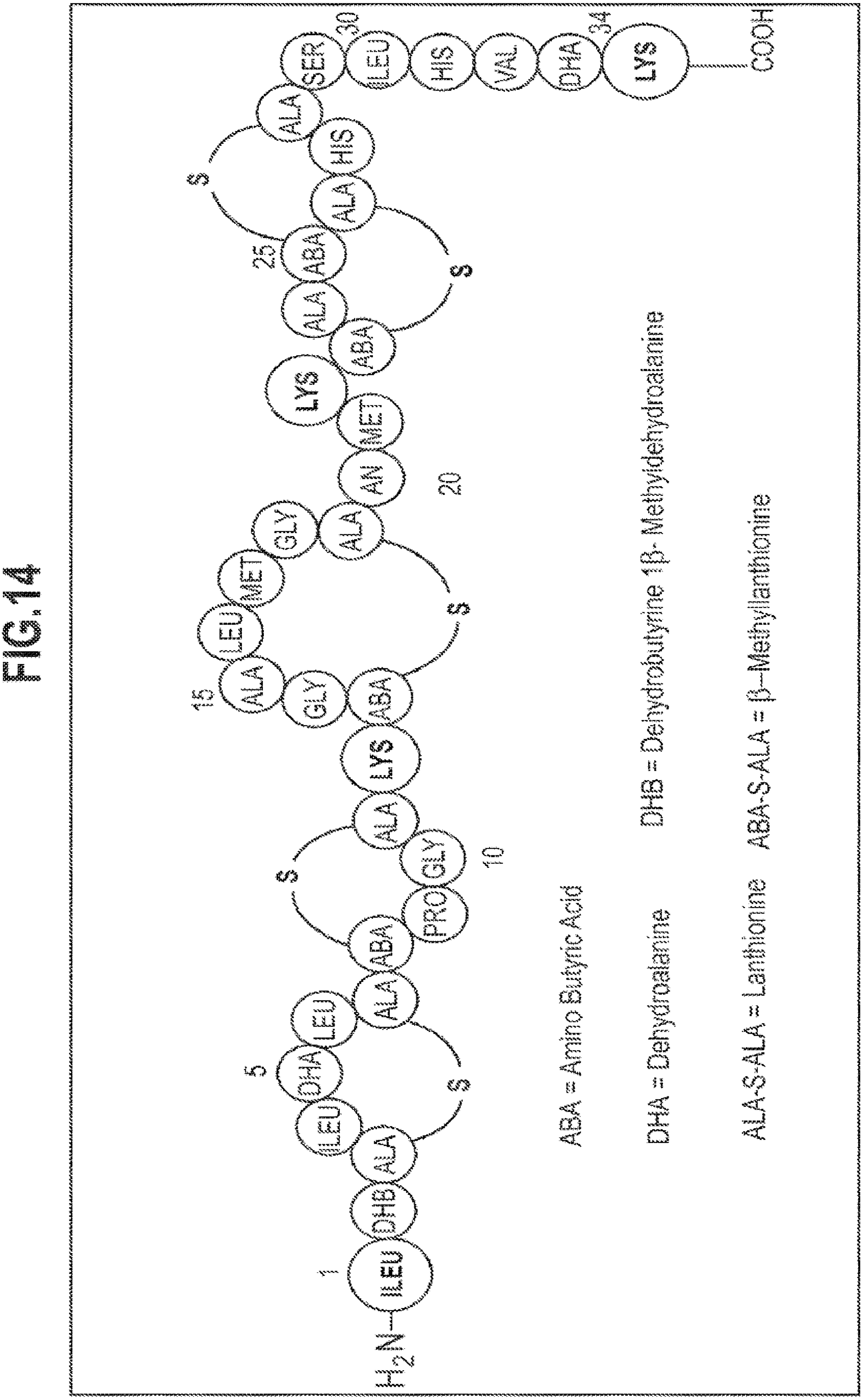
FIG. 14 shows the amino acid sequence of nisin A.

It was found that *Lactococcus lactis* strain 329 has a unique combination of exopolysaccharide and nisin cluster genes as shown in FIG. 13. *Lactococcus lactis* strain 329 includes the nisin cluster genes sequence of Table 2 below and produces nisin A having the amino acid sequence of FIG. 14 (SEQ ID NO 1).

TABLE 2

| GENE | SEQ ID Number |
|---|---|
| Nisin precursor nisin A | SEQ ID NO 9 |
| Nisin transport protein (nisG) | SEQ ID NO 10 |
| Nisin transport protein (nisE) | SEQ ID NO 11 |
| Nisin transport protein (nisF) | SEQ ID NO 12 |
| Nisin two-component system, response regulator (nisR) | SEQ ID NO 13 |
| Nisin sensor-receptor histidine kinase (nisK) | SEQ ID NO 14 |
| Nisin leader peptide-processing serine protease (nisP) | SEQ ID NO 15 |
| Nisin immunity protein | SEQ ID NO 16 |
| Nisin biosynthesis protein (nisC) | SEQ ID NO 17 |
| Nisin transport ATP-binding protein (nisT) | SEQ ID NO 18 |
| Nisin biosynthesis protein (nisB) | SEQ ID NO 19 |

It has been found that, at least under fermentation conditions described herein with reference to the method of FIG. 1, *Lactococcus lactis* strain 329 produces a high level of 34-mer nisin A relative to the 57-mer nisin A precursor peptide (nisin A precursor has the amino acid sequence of SEQ ID NO 20). Nisin A is produced by posttranslational modification of the nisin A precursor. At least in some approaches, *Lactococcus lactis* strain 329 produces nisin A relative to nisin A precursor at a ratio of at least about 9:1, in another aspect at least about 9.5:0.5. In contrast, Danisco's Nisaplin® includes approximately 83 percent nisin A and 17 percent nisin A precursor.

Under the same fermentation conditions effective to produce nisin A described above, *Lactococcus lactis* strain 329 also produces exopolysaccharide, such as, for example, under fermentation conditions described herein with reference to the method of FIG. 1. *Lactococcus lactis* strain 329 includes the EPS cluster genes of Table 3 below:

TABLE 3

| GENE | SEQ ID Number |
|---|---|
| Transcriptional regulator, XRE family | SEQ ID NO 21 |
| Esterase (EpsX) | SEQ ID NO 22 |
| Tyrosine-protein kinase transmembrane modulator (epsC) | SEQ ID NO 23 |
| Tyrosine-protein kinase | SEQ ID NO 24 |
| Undecaprenyl-phosphate galactose phosphotransferase | SEQ ID NO 25 |
| Manganese depended tyrosine-protein phosphatase | SEQ ID NO 26 |
| Polysaccharide biosynthesis protein (cpsF)/glycosyl transferase (cpsG) | SEQ ID NO 27 |
| Glycosyl transferase (cpsG)/ polysaccharide biosynthesis protein (cpsM(v)) | SEQ ID NO 28 |
| Glycosyltransferase family 2 protein | SEQ ID NO 29 |
| Sugar transferase, (epsL) | SEQ ID NO 30 |
| Protein of unknown function, unknown family | SEQ ID NO 31 |
| Protein of unknown function, unknown family/Beta-1,3-glucosyltransferase | SEQ ID NO 32 |
| Polysaccharide biosynthesis protein (cpsM(v)) | SEQ ID NO 33 |

At least in some approaches, an antimicrobial-producing bacterial strain useful in the methods described herein is able to produce both nisin A of about 2000 IU/gram or more and exopolysaccharide under the fermentation conditions described in reference to FIG. 1.

The sequence information provided herein should not be so narrowly construed so as to require inclusion of erroneously identified nucleotides. The sequences disclosed herein can be used by one of ordinary skill in the art to isolate the complete gene from the bacterial strain and subject the gene to further sequence analysis to identify any sequencing errors.

As used herein, the terms "homology" and "identity" are used interchangeably. For purposes of determining the percent identity or homology of two sequences, the sequences may be aligned for optimal comparison purposes. The nucleotides or amino acids are then compared at corresponding nucleotide or amino acid positions of the two sequences. For example, a nucleotide or amino acid in a first sequence is considered identical to that of the second sequence when the same nucleotide or amino acid is located in the corresponding position in the second sequence. The percent identity is calculated by determining the number of identical positions divided by the total number of positions (i.e., overlapping positions) multiplied by 100.

Functional nucleic acid equivalents are also contemplated herein. For example, functional nucleic acid equivalents include silent mutations or other mutations that do not alter the biological function of the encoded polypeptide.

In one form, an antimicrobial-producing bacterial strain useful in the methods described herein has one or more genes of significant homology to SEQ ID NOS 9-19 and 21-33 and is able to produce nisin A and EPS under the same fermentation conditions. As defined herein, the term "significant homology" means at least 70 percent, in another aspect at least 75 percent, in another aspect at least 80 percent, in another aspect at least 85 percent identity, in another aspect at least 90 percent identity, in another aspect at least 95 percent identity, in yet another aspect at least 99 percent identity, and in yet another aspect complete identity.

In some approaches, an antimicrobial-producing bacterial strain useful in the methods described herein has at least two genes of significant homology to the sequences selected from the group consisting of SEQ ID NOS 9-19 and 21-33, in another aspect has at least three genes of significant homology to the sequences selected from the group consisting of SEQ ID NOS 9-19 and 21-33, in another aspect has at least four genes of significant homology to the sequences selected from the group consisting of SEQ ID NOS 9-19 and 21-33, in another aspect has at least five genes of significant homology to the sequences selected from the group consisting of SEQ ID NOS 9-19 and 21-33, in another aspect has at least six genes of significant homology to the sequences selected from the group consisting of SEQ ID NOS 9-19 and 21-33, in another aspect has at least seven genes of significant homology to the sequences selected from the group consisting of SEQ ID NOS 9-19 and 21-33, in another aspect has at least eight genes of significant homology to the sequences selected from the group consisting of SEQ ID NOS 9-19 and 21-33, in another aspect has at least nine genes of significant homology to the sequences selected from the group consisting of SEQ ID NOS 9-19 and 21-33, in another aspect has at least ten genes of significant homology to the sequences selected from the group consisting of SEQ ID NOS 9-19 and 21-33, in another aspect has at least eleven genes of significant homology to the sequences selected from the group consisting of SEQ ID NOS 9-19 and 21-33, in another aspect has at least twelve genes of significant homology to the sequences selected from the group consisting of SEQ ID NOS 9-19 and 21-33, in another aspect has at least thirteen genes of significant homology to the sequences selected from the group consisting of SEQ ID NOS 9-19 and 21-33, in another aspect has at least fourteen genes of significant homology to the sequences selected from the group consisting of SEQ ID NOS 9-19 and 21-33, in another aspect has at least fifteen genes of significant homology to the sequences selected from the group consisting of SEQ ID NOS 9-19 and 21-33, in another aspect has at least sixteen genes of significant homology to the sequences selected from the group consisting of SEQ ID NOS 9-19 and 21-33, in another aspect has at least seventeen genes of significant homology to the sequences selected from the group consisting of SEQ ID NOS 9-19 and 21-33, in another aspect has at least eighteen genes of significant homology to the sequences selected from the group consisting of SEQ ID NOS 9-19 and 21-33, in another aspect has at least nineteen genes of significant homology to the sequences selected from the group consisting of SEQ ID NOS 9-19 and 21-33, in another aspect has at least twenty genes of significant homology to the sequences selected from the group consisting of SEQ ID NOS 9-19 and 21-33, in another aspect has at least twenty-one genes of significant homology to the sequences selected from the group consisting of SEQ ID NOS 9-19 and 21-33, in another aspect has at least twenty-two genes of significant homology to the sequences selected from the group consisting of SEQ ID NOS 9-19 and 21-33, in another aspect has at least twenty-three genes of significant homology to the sequences selected from the group consisting of SEQ ID NOS 9-19 and 21-33, and in yet another aspect has at least twenty-four genes of significant homology to the sequences selected from the group consisting of SEQ ID NOS 9-19 and 21-33.

Turning to more of the specifics regarding methods of producing an effective cultured dairy concentrate and processed cheese and first referring to FIG. 1, a process flow diagram 10 is provided that illustrates one method of producing a cultured dairy material or cultured dairy concentrate 12 effective to produce both an antimicrobials (such as nisin A) and EPS from the same culture and under the same conditions, the product of which is effective for use with processed cheese. In this exemplary process 10, a liquid dairy starting material 14, such as a dairy liquid like whole milk may be used. In other approaches, the starting dairy liquid may be milk protein concentrate and or whey materials. The starting material 14 may have from about 5 to about 35% total solids, about 0 to about 16 percent fat, about 1 to about 14 percent protein, and about 64 to about 95 percent moisture. In another form, the starting material 14 is 3.5× concentrated whole milk having about 26 to about 30 percent total solids, about 10 to about 15 percent fat, about 8 to about 12 percent protein, and about 70 to about 70 percent moisture.

In another approach, the starting material 14 is a concentrated dairy liquid obtained from the ultrafiltration of liquid dairy milk. The concentrated starting material may be concentrated to a 2× to a 5× concentration as determined by total solids, in other approaches, about a 2× to about a 4×, and in yet other approaches, about a 3× to about a 3.5× dairy liquid. That is, a 3× concentration has 3 times the level of total solids relative to a starting dairy liquid, and a 5× concentration has about 5 times the level of total solids relative to the starting dairy liquid. In one approach, an ultra-filtration membrane may be used to achieve an appropriate concentrated starting material. One suitable membrane has a molecular weight cutoff of about 5 to about 20 KD. Other methods of concentration may also be used including microfiltration, nanofiltration, and reverse osmosis as needed for a particular application.

As discussed further below, fermentation in concentrated milks, such as the 2× to 5× milk of the present disclosure typically presents problems with prior antimicrobial cultures and fermentations. Strain 329 used within the products and methods of the present disclosure uniquely allows fermentation in a concentrated dairy liquid and, at the same time, permits formation of both nisin and EPS from the same strain and under the same fermentation conditions. By utilizing the concentrated milks for the fermentation and the ultimate production of the processed cheese ingredients herein, water content in the resultant process cheese is better controlled. The concentrated dairy components of the present disclosure combine multiple functionalities and components (i.e., such as nisin and EPS) in the same ingredient. In some approaches, this reduces the overall moisture load in the processed cheese manufacturing process and, in some cases, also simplifies the processed cheese ingredient line.

Figure 5A:
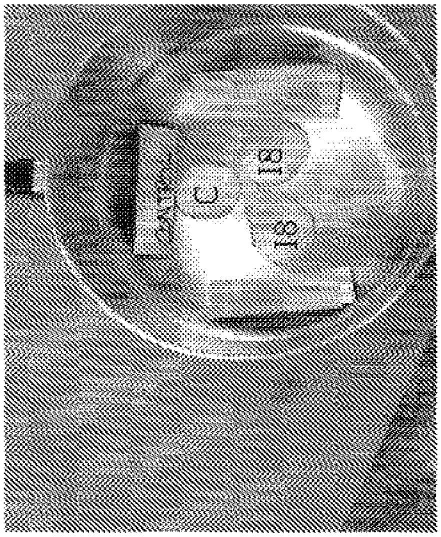
FIGS. 5A-5C are photographs showing melt comparisons for various processed cheeses with and without cultured dairy components.
Figure 5B:
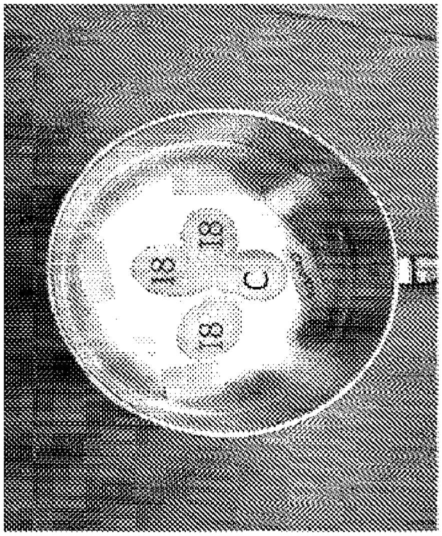

The starting material 14, which is either a liquid dairy or concentrated liquid dairy component, is then pasteurized 16 and then enters one or more fermenters 18. Pasteurization may be about 150 to about 190° F. for about 20 to about 40 seconds resulting in an exit temperature of the pasteurized starting material of about 80 to about 90° F. An antimicrobial-producing culture 20, such as *Lactoccocus lactis* strain 329, is added to the fermenter 18 along with a base solution 22 such as sodium hydroxide (e.g., a dilute 5.5N sodium hydroxide). In one form, about $2\times10^6$ to about $2\times10^8$ CFU/ml of the antimicrobial-producing culture 20 is added to the fermenter. In one embodiment, the culture 20 is a thawed form of the culture. In one approach, the fermentation temperature is maintained at about 25 to about 35° C. (in some approaches about 28 to about 32° C., and in other approaches, about 30° C.) and a pH of about 5 to about 6 (in other approaches, about 5.4 to about 5.8, and in yet other approaches, about 5.4 to about 5.6) in the fermenter. Other temperatures and pH's may also be used if the culture is able to produce nisin and EPS at desired levels under the selected conditions. For example, in one approach, the pH ranges from about 5 to about 7 and the temperature ranges from about 20 to about 40° C. The composition may be fermented over a variety of different time periods to impart different flavor characteristics to the composition. For example, in one approach, the composition is fermented for about 18 to about 22 hours. In another form, the fermentation may take place over a range of about 15 to about 48 hours. As shown in FIG. 5, by varying the fermentation time, the flavor of the cultured dairy component, and resultantly the processed cheese flavor, may be modified.

The composition is next sent to an optional shear device 24 to shear small/soft curds that may have formed. In one approach, the shear device may be a rotor/stator mixer (such as a Dispax) or other rotor shear device. This step may be optional depending on the other processing conditions as well as the properties of the materials utilized in the process. The composition is then finally subjected to an optional heat treatment step 26. In one form, the composition is heat treated 26 at about 150° F. to about 160° F. for approximately about 60 to about 100 seconds. In another form, the composition is heat treated to reduce CFU/ml to less than about 1000 CFU/ml. The resulting composition 12 is a cultured dairy component or cultured dairy concentrate that includes nisin and/or a nisin-producing material and, at the same time, EPS and/or an EPS-producing material. At least in some approaches, these two components are advantageously produced from the same starting bacterial strain, such as strain 329, and under the same fermentation conditions. The composition may be in the form of a liquid having approximately 6 to about 40% total solids. In one form, the liquid has approximately 20 to about 30% total solids, and in some approaches about 28.5% total solids.

Figure 1A:
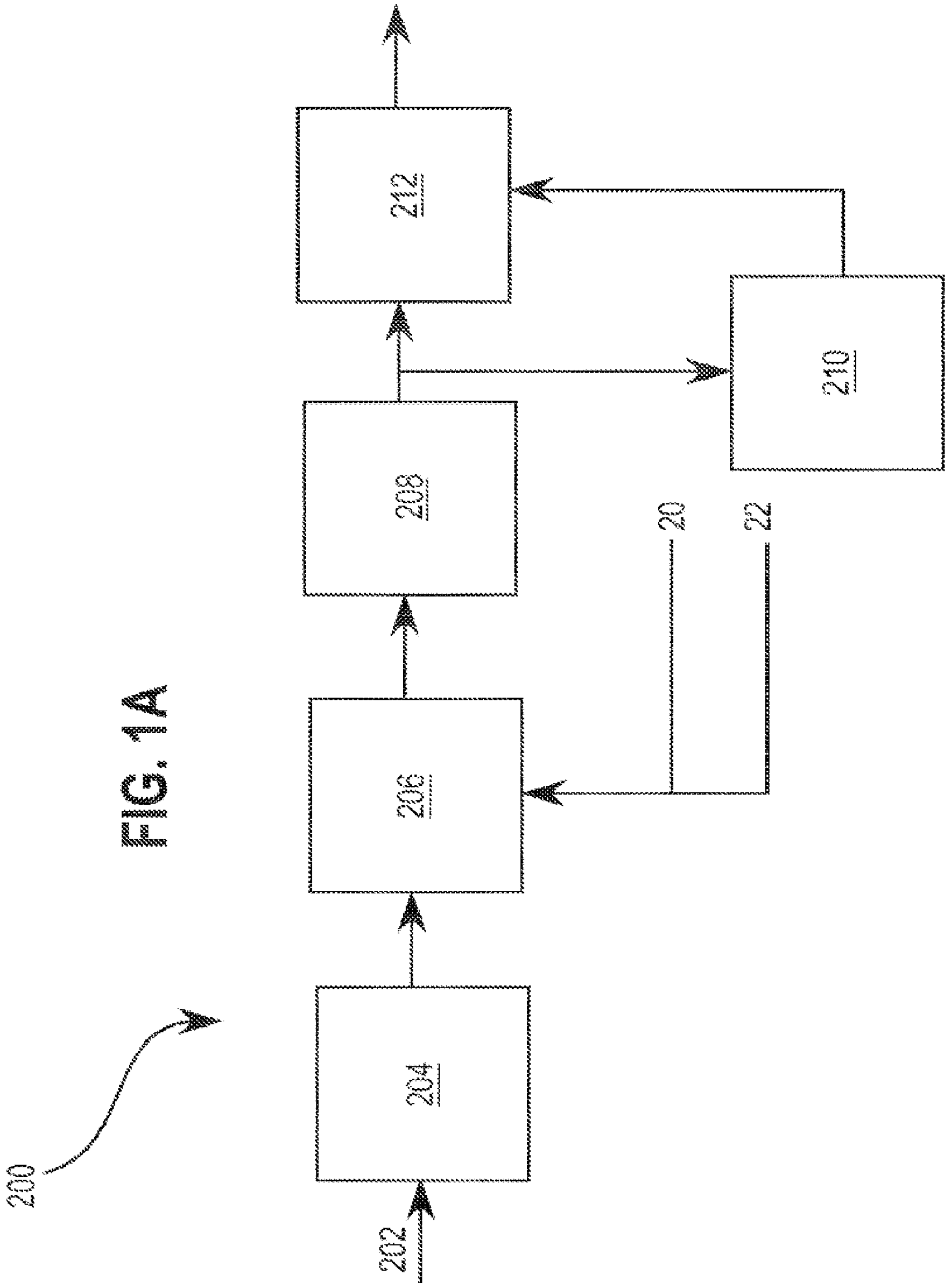
FIG. 1A is an alternative process flow diagram.

In an alternative method 200 shown in FIG. 1A, hydrated powders and/or liquid milk 202 may be first heated 204, such as in a high temperature, short time sterilization (HIST) or an ultra-high temperature (UHT) sterilization process step. Next, the heated liquid is then fermented 206 with similar materials, cultures, and conditions as described with respect to the previously discussed method. After fermentation, the material may be optionally sheared 208 and then concentrated 210. In this approach, concentration may be membrane filtration, evaporation, or centrifugation. After concentration, the resultant concentrate may be optionally heated 212 again using HTST or UHT, for example.

Figure 2:
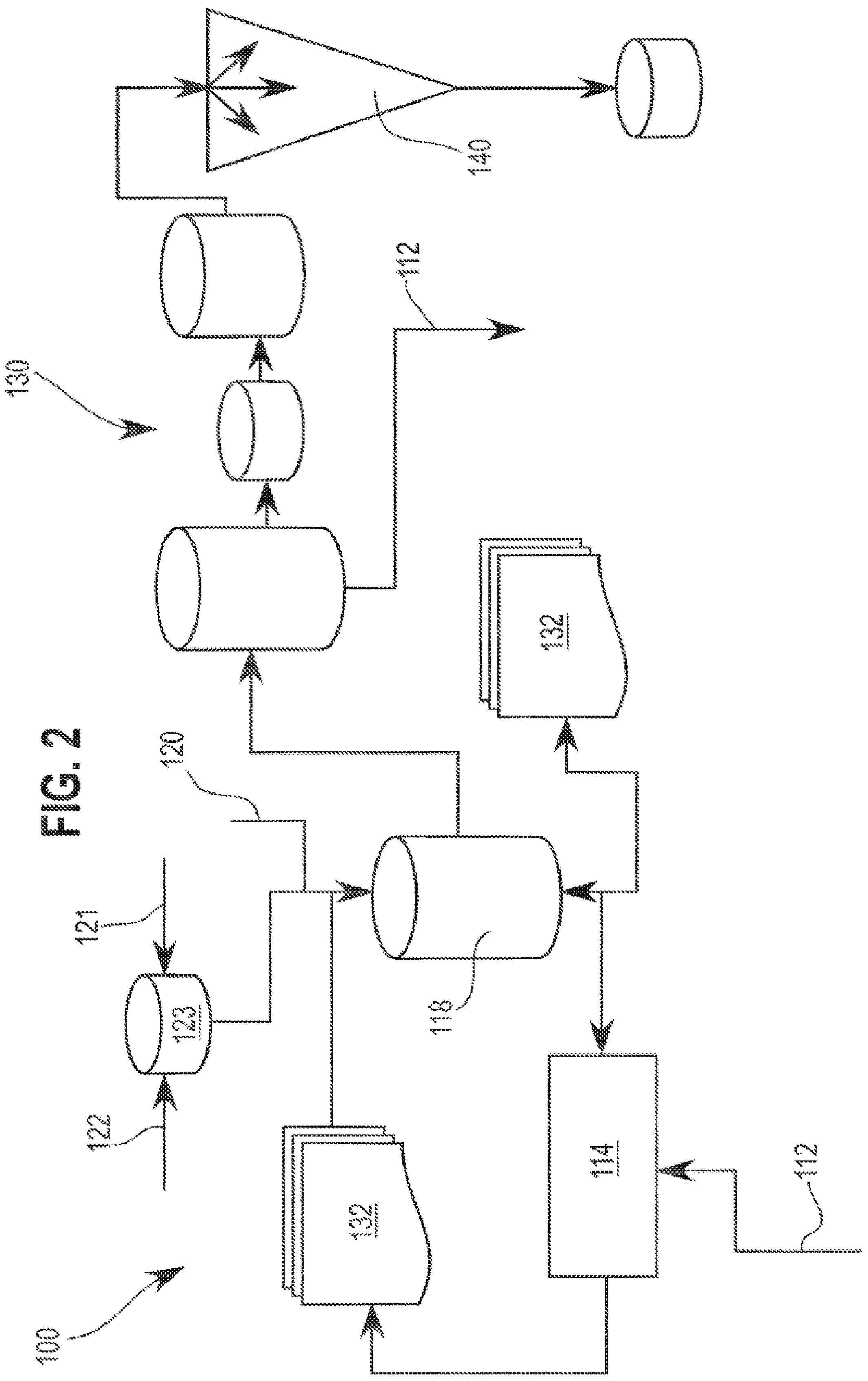
FIG. 2 is a process flow diagram illustrating a second form of production of an exemplary cultured dairy component produced from powdered dairy ingredients.

Another process 100 for preparing cultured dairy components is illustrated in FIG. 2. The process 100 in FIG. 2 utilizes powdered starting materials 112 such as powdered milk protein concentrate and powdered whey. In this approach, about 3 to about 10 percent powdered milk protein concentrate, about 2 to about 6 percent powdered whey, and about 75 to about 95 percent water are blended in a tank or a fermenter 118 to form the fermentation medium. The powders may be mixed 114 and hydrated prior to being added to the fermenter 118. These starting materials are then combined with an antimicrobial-producing culture 120, such as *Lactococcus lactis* strain 329, in an amount of about $2\times10^6$ CFU/ml to about $2\times10^8$ CFU/ml in the fermentation vessel 118 and fermented in a similar manner as described for FIG. 1. Similar to the method of FIG. 1, process water and a base, such as a dilute sodium hydroxide may also be added to the fermentation vessel 118 from tank 123. After fermentation, the composition may optionally be heated or cooled as necessary and then prepared into a final cultured dairy component 112. In some approaches, the process may include various intermediate heating and cooling 132 as needed for a particular application. In this regard, the composition 112 may be placed in one or more holding tanks 130 or other storage location for use in a concentrated liquid form. Holding tank temperatures may be about 30 to about 50° F. In one embodiment (such as in a liquid form), the cultured dairy component has from about 6 to about 11% total solids and in another form, about 20% total solids. Further, the cultured dairy component may be spray-dried, such as in an atomizer 140. In one approach, the atomizer may have a dryer temperature of about 160 to about 180° F. and about a 15 to about 25 psi pressure drop.

The cultured dairy component may take a variety of forms. For example, as shown in FIGS. 1 and 2, the cultured dairy component may be in the form of a liquid. The cultured dairy component may also take the form of a powder, such as from spray drying as shown in FIG. 2. Furthermore, the cultured dairy component may also be in a concentrated form, such as components obtained by evaporation, filtering and the like. The resulting product of the method from FIG. 1 or 2 may be either a liquid or spray dried depending on the particular application. FIG. 2 provides exemplary steps for spray drying and it will be appreciated that these steps can also be used with the methods of FIG. 1. It will be appreciated that if the cultured dairy component is further processed by concentration, spray drying or the like, this further processing will be completed in a manner to not substantially affect the raisin and/or EPS.

The cultured dairy component produced by the methods of FIGS. 1 and 2 with both antimicrobials and EPS produced from the same bacterial strain may then be used in and/or to manufacture processed cheese. In one approach, the processed cheese may be produced by blending together natural cheese or mixture of natural cheeses, moisture, and a an optional additional dairy protein source (such as milk protein concentrate, whey, whey protein concentrate, ultrafiltered milk, and the like) and the cultured dairy component. Sodium chloride may be added for flavor. Other optional ingredients may be added to improve texture, flavor, nutrition, and/or cost attributes. These include, but are not limited to, whey derived ingredients (e.g., whey protein concentrate), non-fat dry milk, milk protein concentrate, anhydrous milk fat, gums, starches, gelatin, and the like. The ingredients are blended together and then heated to pasteurization temperatures. Optionally, shear may be applied during or after the heating.

Whey protein refers to a collection of globular proteins that can be isolated from whey, which is the liquid remaining after milk has been curdled and strained. Whey protein is typically a mixture of beta-lactoglobulin, alpha-lactalbumin, and serum albumin proteins. In one embodiment, whey protein concentrate (WPC) may be used as the whey protein source. WPC is derived from whey by conventional concentration techniques. The whey protein source may also include lactose, vitamins, minerals, and fat.

Moisture may be added to the blend by any method, such as, but not limited to, injecting steam into the cooker (e.g., a lay down cooker), comingling of condensed steam from cooking, and/or direct addition of water. Of course, moisture can also enter into the system through the various ingredients (e.g., moisture from the natural cheese). Overall moisture of the final cheese products includes all moisture independent of how the moisture was introduced into the final product. Advantageously, because the cultured dairy components of the present disclosure, in some forms, are concentrated dairy components that include both nisin and EPS at the same time, water management of the processed cheese is improved. To this end, because nisin and other texture modifying ingredients do not need to be separately added, less water tends to be added into the processed cheese via the cultured dairy component ingredient.

As is known by one of ordinary skill in the art, the ingredients may be used in varying amounts in the processed cheese depending on the desired outcome of the cheese product. For example, for a reduced sodium cheese product, a cheesemaker may include a small amount or no salt in the cheese blend. The processed cheese may also include a range of amounts of the cultured dairy components, depending on the form and composition of the cultured dairy components and the desired form of the processed cheese.

For example and in one form, the processed cheese may include about 10 to about 90% natural cheese. According to another form, the processed cheese may include about 30 to about 60% natural cheese. In yet another form, the processed cheeses herein may include about 35 to about 55% natural cheese. As used herein, natural cheese generally means cheese provided from unpasteurized cheese obtained from curdled milk and one of rennet, rennet substitutes, acidification, and combinations thereof.

The processed cheese may also include a number of other dairy ingredients from various sources as needed for a particular application. For example and in one form, the processed cheese may include milk protein concentrate from about 0 to about 50% (in other approaches, about 10 to about 25%), whey protein concentrate from about 0 to about 25% (in other approaches, about 1 to about 10%), whey from about 0 to about 30% (in other approaches, about 1 to about 10%), milkfat/cream from about 0 to about 30% (in other approaches, about 1 to about 15%) and the like. The processed cheese may also include emulsifiers, such as sodium citrate, disodium phosphate and the like in an amount of about 0% to about 5% (in other approaches, about 1 to about 3%). The processed cheese may also include salt, flavorings, fortifications, colorants and the like to provide the desired color, flavor, etc. The processed cheese may also include added water and/or moisture from the ingredients to provide the desired finished product moisture. For example, vitamins and other minerals may also be added as needed to fortify the processed cheese, by one approach, from about 0 to about 3 percent of vitamin A, vitamin D and/or calcium powders (such as tricalcium phosphate). In other applications, salt may also be added as needed. In some approaches, about 0 to about 5 percent salt may be added.

Furthermore, instead of traditional preservatives, the processed cheese may include the cultured dairy component of the present disclosure and made via the methods described herein. In one form, the processed cheese may include about 1 to about 20% cultured dairy component. In another form, the processed cheese includes about 4 to about 10% cultured dairy component. In some approaches, the cultured dairy components of the present disclosure provide a much higher total antimicrobial activity as nisin equivalent relative to the nisin content (a nisin activity ratio). For instance and in some approaches, the cultured dairy components and processed cheese utilizing the amounts of cultured dairy components described herein exhibit a nisin activity ratio of about 0.3 or less.

It should be noted that the cultured dairy components may be used as a replacement for artificial preservatives and/or may also be used to partially supplement or replace other components in the overall processed cheese composition. For example, depending on the form of the cultured dairy component, the amount of the cultured dairy component may be used to supplement or otherwise replace a portion of the other dairy materials in the composition, such as the milk fat, casein, whey and the like. In other words, the ratio of the other dairy materials may be modified as a result of the use of the cultured dairy components. When the processed cheeses include the cultured dairy components herein, the cheese may be substantially free of traditional preservatives, such as sorbic acid, nitrites and the like. By one approach, substantially free of generally means less than about 0.5 percent, in other approaches, less than about 0.1 percent, and in other approaches, not present at all.

In one form, the processed cheese includes about 40% natural cheese, 35% other dairy materials, about 8% cultured dairy components, about 12% water and the remainder salts, flavoring, colors, vitamins, minerals and the like. The processed cheese may be manufactured as generally understood with the addition of the cultured dairy components during cooking, and alternatively, during cheese blending steps. In one form, the cheese product described herein may be any of a cheese dip, a cheese spread, a cheese block, a cheese slice, a shredded cheese, or the like. In some approaches, the various forms of processed cheese of the present disclosure may include about 10 to about 90% natural cheese, about 0 to about 50% milk protein concentrate, about 0 to about 30% milk fat or cream, about 40 to about 60% water, about 1 to about 20% cultured dairy component, about 0 to about 30% whey, and about 0 to about 25% whey protein concentrate in combination with various optional flavors, salts, and emulsifiers described above.

In another form, the processed cheese includes about 10 to about 30% total fat (in other approaches, about 20 to about 30% fat), about 8 to about 25% total protein (in other approaches, about 15 to about 25% total protein), and about 40 to about 60% total moisture other approaches, about 40 to about 50% moisture).

Not only does the processed cheese made with the cultured dairy components of the present disclosure exhibit unexpected benefits of texture because it achieves an improved melt profile and increased firmness at the same time, the processed cheese made with the cultured dairy components of the present disclosure also exhibits improved antimicrobial characteristics in the context of a high protein and high fat product, such as a processed cheese with about 10 to about 30% fat and about 8 to about 25% protein. While prior commercial forms of nisin were commonly understood to inhibit *C. botulinum* in liquid media or broth, when such prior forms of nisin were used in a high-protein and high-fat food systems, such as processed cheese, the nisin was less effective at inhibiting the *C. botulinum* and other pathogens. While not wishing to be limited by theory, it is believed that the high protein, high fat, and in some case, the lower moisture level of the processed cheeses described herein, tend to protect and/or encapsulate the *C. botulinum* and other pathogens rendering traditional nisin and traditional natural antimicrobials less effective. It was unexpectedly discovered that the nisin obtained from the antimicrobial cultures herein, and in particular, strain 329, are effective to inhibit *C. boiulinum* and other food-borne pathogens such as *Listeria monocytogenes*, in the context of high fat and high protein processed cheese much better than other forms of nisin as generally shown below in Example 1. In some approaches, the cultured dairy component in processed cheese provides an amount of nisin effective to prevent toxin formation from at least *C. botulinum* as determined by conventional toxin bioassay with mice in the processed cheese at the high protein and the high fat levels described herein for at least about 9 to about 10 days at about 86° F. In one approach, the biotoxin assay may be performed in accordance with Haim M. Solomon et al., Bacteriological Analytical Manual, Chapter 17, *Clostridium botulinum*, January 2001, available at http://www.fda.gov/Food/FoodScienceResearch/LaboratoryMethods/ucm070879.htm, which is hereby incorporated by reference in its entirety.

Not only do the cultured dairy components of the present disclosure inhibit *C. botulinum* and other pathogens in the context of a high protein and high fat processed cheese, the cultured dairy components achieve such inhibitory effects at lower activity levels and/or lower dosage levels than previously found possible.

In other approaches, liquid forms of the cultured dairy components herein or made by the processes herein retain higher levels of nisin activity in the final processed cheese, which was not achievable using prior commercial forms of nisin when used in processed cheeses. By one approach, the cultured dairy ingredients described herein and made by the methods described herein are effective to retain about 50 to about 90 percent activity, and in other approaches, about 60 to about 75 percent activiti as compared to the activity of the ingredient prior to incorporation into the processed cheese.

In some approaches, the cultured dairy component is made using an ultrafiltered dairy liquid either before or after fermentation. In these approaches, the cultured dairy component has reduced levels of lactose and other dairy minerals. For example and in some approaches, the cultured dairy component and the processed cheese utilizing the cultured dairy component may have less than about 0.1 percent lactose and less than about 15 percent lactate as acid. In other approaches, the cultured dairy component and the processed cheese utilizing the cultured dairy component may also have less than about 600 mg/100 grams of calcium.

Advantages and embodiments of the compositions, methods, and compositions produces by the methods described herein are further illustrated by the following examples; however, the particular conditions, processing schemes, materials, and amounts thereof recited in these examples, as well as other conditions and details, should not be construed to unduly limit this method. All percentages and ratios within this disclosure are by weight unless otherwise indicated.

EXAMPLES

The following examples illustrate the performance of processed cheese slices prepared with cultured dairy components as described above and control samples of process cheese without the cultured dairy component but, instead, using sorbic acid as the preservative. The samples were generally prepared as processed cheese slices having about about 46 percent moisture, about 23 percent fat, about 1.2 percent salt, and about 18 percent protein with varying amounts of preservatives and/or cultured dairy components (where indicated), flavors, colors, vitamins, minerals and the like.

Example 1

Processed cheese slices were prepared utilizing liquid cultured dairy component with 28% solids as described herein from strain 329 and compared to processed cheese slices prepared with cultured spray-dried whey. The cultured spray-dried whey was in a powdered form having approximately 96% solids with essentially no fat and little protein. Both the commercial, cultured spray-dried whey and the liquid cultured dairy component made according to the process of FIG. 1 and utilizing strain 329 were used in a processed cheese. Table 4 below illustrates that the processed cheese prepared with cultured dairy components from strain 329 retained significantly more antimicrobial activity when compared to commercially available antimicrobial materials. This activity retention effect was seen for both the 6% and 8% loading of the cultured dairy components in processed cheese. In this regard, as the cultured dairy components retain antimicrobial activity much better than the commercially available microbial, the antimicrobial effect may last longer and otherwise require lower dosing for the same efficacy.

TABLE 4

Activity retention of antimicrobials in processed cheese

| Antimicrobial | Ingredient Activity AU/g | % Usage in Processed Cheese | Dosage Level AU/g | Activity Level in processed cheese slice, AU/g | % Retention |
|---|---|---|---|---|---|
| Comparative, spray dried cultured whey | 20,000 | 1% | 200 | 90 | 45% |
| Comparative, spray dried cultured whey | 20,000 | 2% | 400 | 130 | 32.5% |
| Liquid, cultured dairy component of the present disclosure | 2220 | 6% | 133.2 | 90 | 67.6% |
| Liquid, cultured dairy component of the present disclosure | 2220 | 8% | 177.6 | 150 | 84.5 |

Another comparison was made where a liquid cultured dairy component prepared from powders and combined with liquid water according to the method of FIG. 2 having about 20% total solids were prepared. In this comparison, a commercially available nisin source (Nisaplin, Danisco) and a spray dried cultured whey powder were each included in processed cheese and compared to a similar processed cheese made with the cultured dairy component of the present disclosure. As shown in Table 5 below, when 8% of the cultured dairy component made from strain 329 in accordance with the present disclosure was used in processed cheese slices, no toxin (*C. botulinum*) was detected after about 10 days whereas similar processed cheese prepared with commercially available antimicrobials (either Nisaplin or spray dried cultured whey) had toxins present on about days 7 and 10. The toxin challenge study was performed by Silliker Laboratory. Other conventional methodologies for toxin challenge studies may also be used, if desired.

TABLE 5

*C. botulinum* Challenge Study

| Antimicrobial | % Usage in Processed Cheese | Measured AU in Finished Product | Key Results of CBOT Challenge Study |
|---|---|---|---|
| Comparative, Commercially available nisin (Nisaplin) | 0.023% | 210 AU | Toxin present at day 10 |
| Comparative, Spray dried cultured whey | 1% | 90 AU | Toxin positive on day 7@ 86° F. |
| Cultured dairy component of present disclosure (20% total solids, liquid) | 8% | 70 AU | No toxin present at day 10 |

Example 2

Figure 3:
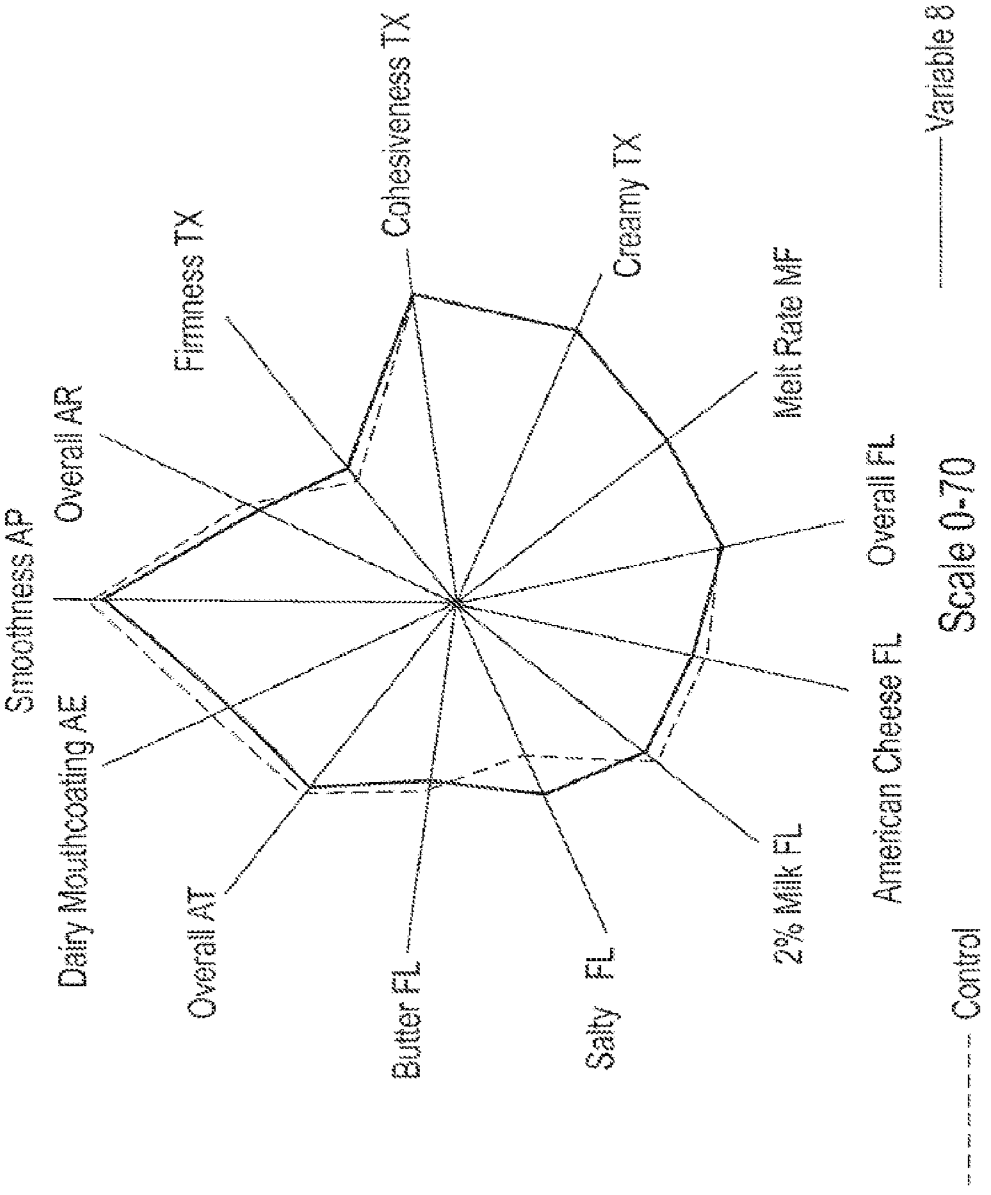
FIG. 3 illustrates taste profiles for processed cheese with and without cultured dairy components.
Figure 4A:
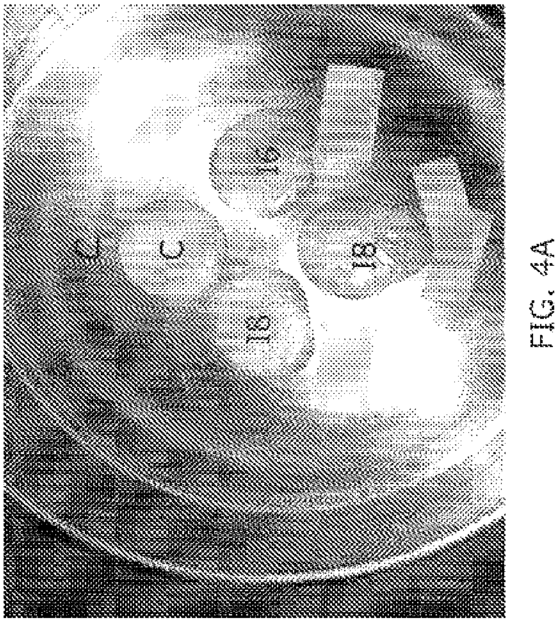
FIGS. 4A-4D are photographs showing melt comparisons for various processed cheeses with and without cultured dairy components.
Figure 4B:
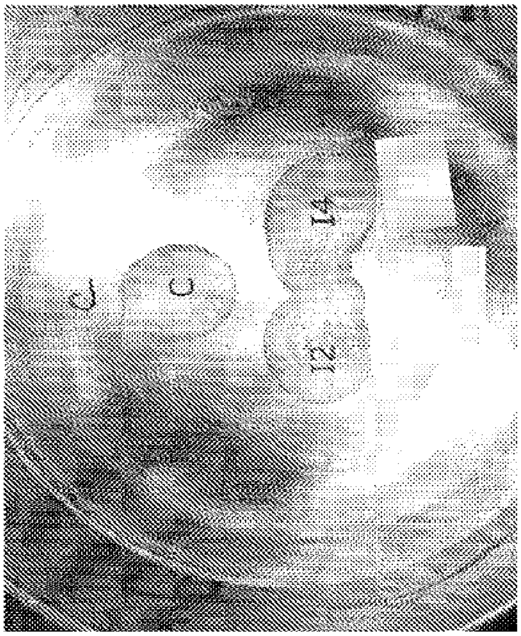
Figure 4C:
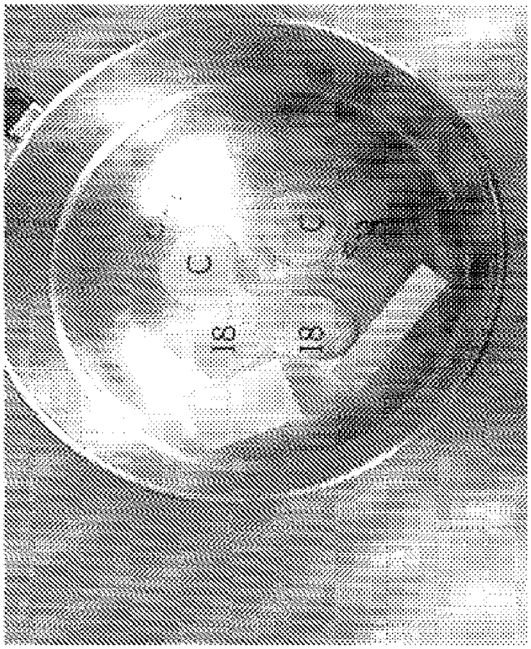
Figure 4D:
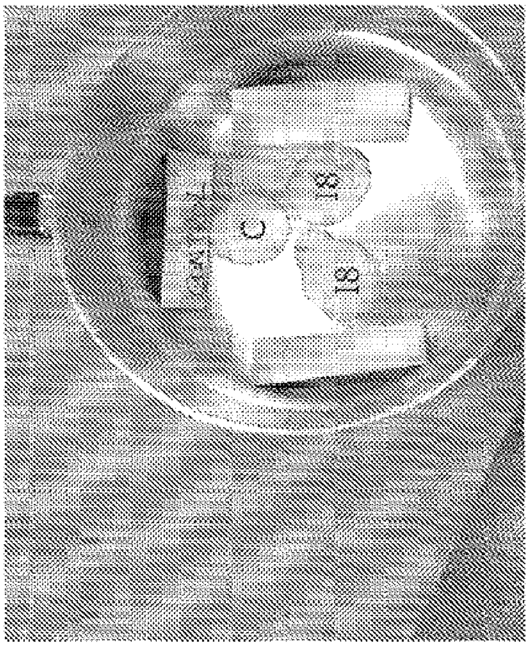
Figure 8:
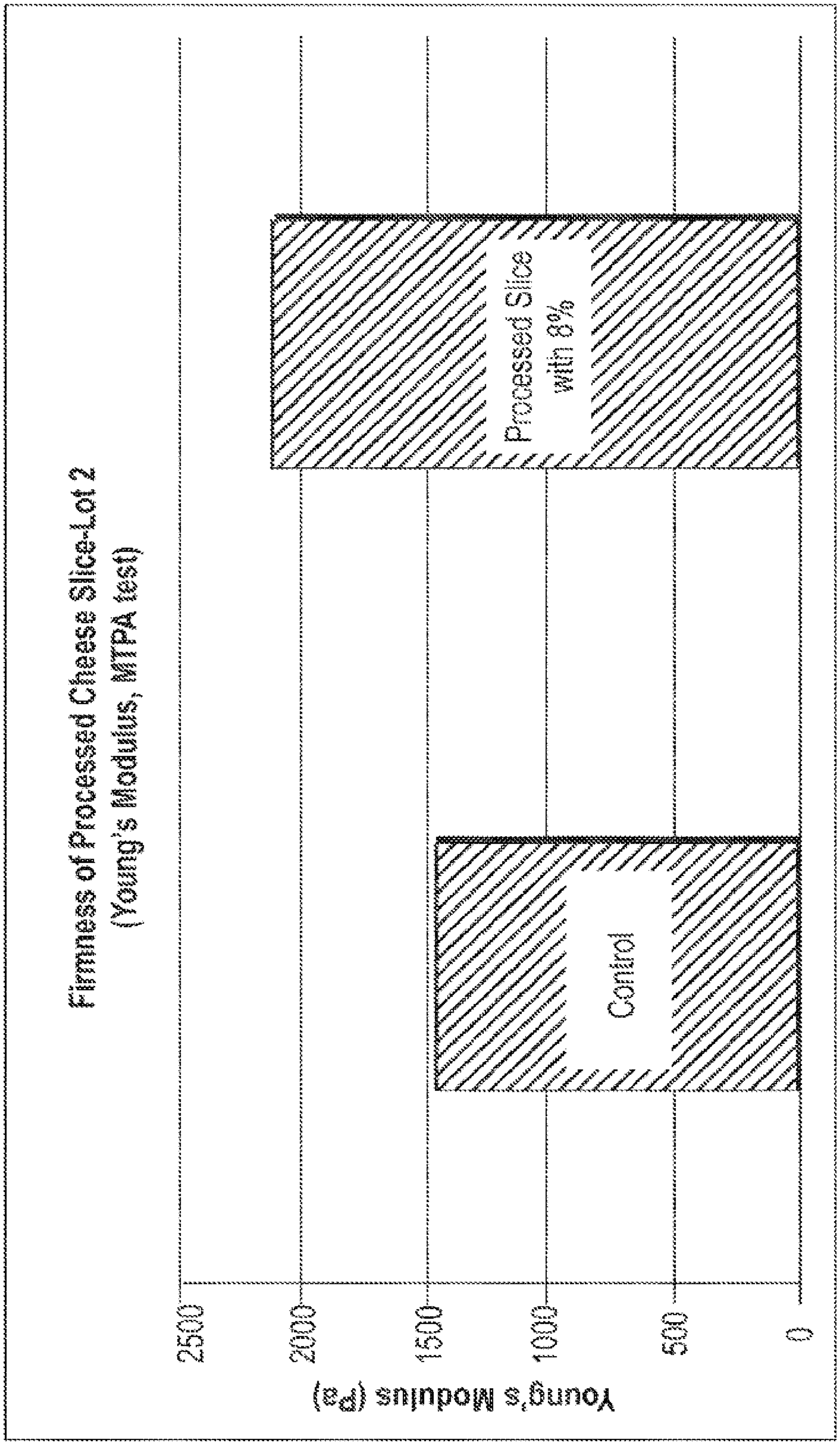
FIG. 8 is a graph showing the firmness measurements for processed cheese with 8 percent cultured dairy components compared to a control without cultured dairy components.

Flavor comparisons were performed on samples of processed cheese slices as shown in FIG. 3. Processed cheese samples were prepared with about 0.2 percent sorbic acid as a preservative (identified as "control") or without sorbic acid and about 8% cultured dairy component prepared according to the present disclosure and utilizing strain 329 (identified as "variable 8") and tasted and evaluated by a trained sensory panel. As shown in FIG. 8 (which summarizes the taste perception in the mouth of the trained panel), processed cheese prepared with the cultured dairy components of the present disclosure generally had the same taste perception profile as processed cheese prepared with sorbic acid as a preservative. Therefore, it is expected that it would be acceptable, from a flavor perception aspect, to replace sorbic acid as a preservative with cultured dairy components.

Example 3

Numerous processed cheese samples were prepared to compare the melt profiles of processed cheese slices prepared with and without the cultured dairy components obtained from strain 329 of the present application. The samples include about 2% to about 8% cultured dairy components and were compared to control samples without the cultured dairy components. The fat, moisture, protein, and pH of the cheese was held relatively constant between all the test samples (about 43 to about 44 percent moisture and about 5.7 pH). The control samples without the cultured dairy component contained 0.18% sorbic acid as a preservative or, in some cases, were free of sorbic acid in order to rule out that the melt was due to the lack of sorbic acid. In this Example, the samples made with the cultured dairy component increased in melt diameter. The others did not. This is shown by the date in tables 6, 7, and 8 below.

Figure 5C:
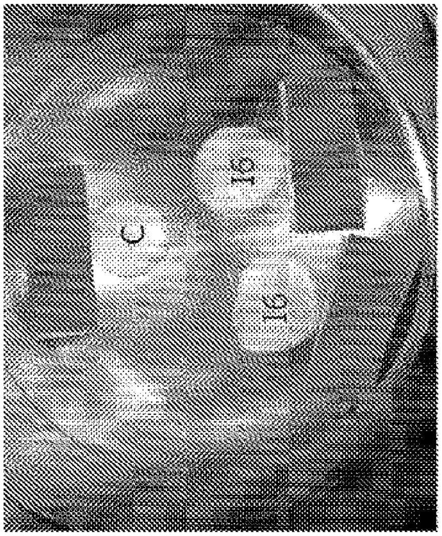

Each test sample included 3 circular slices of processed cheese stacked on top of one another. The samples were placed on top of a double boiler and heated with boiling water on medium heat for approximately 4 minutes. As shown in FIGS. 4A-4D and 5A-5C, the samples prepared with cultured dairy components had increased surface area when melted as compared to the control samples without the cultured dairy components of the present application. As shown in FIG. 5C, the melt diameter of the control cheese was about 1.125 inches while the melt diameter of the inventive samples with about 6 percent of the cultured dairy component were about 1.6 and about 1.45 inches. In these figures, controls samples are labeled “C” and inventive samples are labeled I2, I4, I6, or I8 representing inventive processed cheese disks with either about 2 percent, 4 percent, 6 percent or 8 percent cultured dairy component made with strain 329.

Surface area measurements were completed to measure the melt profiles of the samples. Tables 6, 7, and 8 to below illustrate calculated surface areas using ImageJ software (a public domain, Java-based image processing program, National Institute of Health) for some of the samples corresponding to those shown in FIGS. 4A-4D and 5A-5C. As shown in the tables, processed cheese samples prepared with the cultured dairy components of the present application at 4%, 6% and 8% in processed cheese all showed increased surface area upon melting compared to the controls without cultured dairy components. Generally, consumers prefer processed cheese with increased melt performance such as shown by the samples with cultured dairy components.

TABLE 6

Surface Area Measurements

| Sample | Surface Area (square pixels) | Surface Area (square pixels) |
|---|---|---|
| Control Lot | 89088 | 189300 |
| 8% cultured dairy component | 139149 | 326995 |
| % Area Increase w/cultured dairy component | 56.19% | 72.74% |

TABLE 7

Surface Area Measurement

| Sample | Surface Area (square pixels) | % Area Increase with Cultured Dairy Component |
|---|---|---|
| Control Lot | 167488 | n/a |
| 4% liquid cultured dairy component | 211365 | 26.20% |
| 4% cultured dairy component powder | 223930 | 33.70% |

Based on the data above, the samples including the cultured dairy component of the present disclosure resulted in wider disc melts than the control samples without the cultured dairy component.

TABLE 8

Surface Area Measurement

| Sample | Surface Area (square pixels) | % Area Increase with Cultured Dairy Component |
|---|---|---|
| Control Lot | 179171 | n/a |
| 6% liquid cultured dairy component | 233075 | 30.09% |
| 6% cultured dairy component powder | 248472 | 36.68% |

Example 4

FIGS. 6-9 illustrate firmness and consistency comparisons between processed cheese slices made with cultured dairy components made by the methods of the present application using strain 329 and without cultured dairy components (control). In this Example, the solids, protein, fat, and moisture were held relatively constant across all samples tested. The samples without the cultured dairy component included 0.18 sorbic acid as a preservative and, in some cases, did not contain sorbic acid or any preservatives so as to rule out the firmness was due to the lack of sorbic acid. In this Example, only the samples with the cultured dairy component increased in firmness and consistency.

Figure 6:
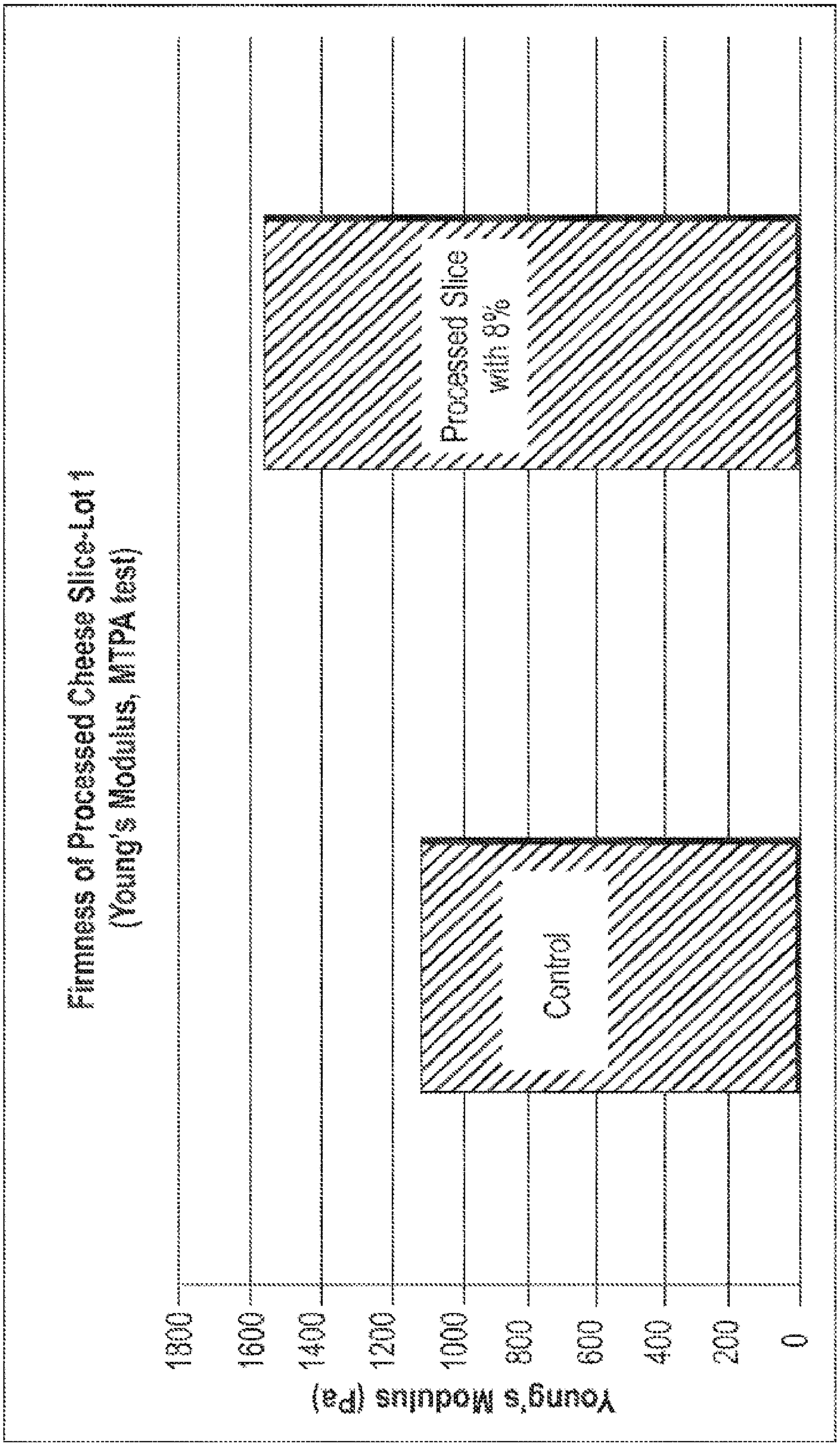
FIG. 6 is a graph showing the firmness measurements for processed cheese with 8 percent cultured dairy components compared to a control without cultured dairy components.

As shown in FIGS. 6 and 8, the processed cheese with cultured dairy components showed increased firmness (i.e., Young’s modulus) compared to the control samples made without cultured dairy components. Generally, this increased firmness suggests a more natural cheese composition to consumers. Young’s modulus, which is also known as the tensile modulus, is a measure of the stiffness of a material. In the context of a processed cheese, Young’s modulus is a measurement of the initial touch of the cheese slice. In the context of this Example, initial touch means the resistance that the cheese provides when it is touched with a finger or hand. It is another measurement of the perception of firmness. Young’s Modulus was measured using a texture profile analysis (MTPA) using a texture analysis machine (Texture Technologies Corp) that measures the amount of force needed to penetrate a stack of cheese slices when a known weight is applied. For this test, about ten 21 gram slices of cheese are stacked together. Generally, Young’s modulus is calculated by dividing the tensile stress by the tensile strain in the material and represents the ratio of stress (load) to the strain (deformation) in the initial Hookean region. This typically represents how stiff or firm a sample is in response to an external load. Further, a product having a higher consistency value should provide a more chewy sensory perception.

Figure 7:
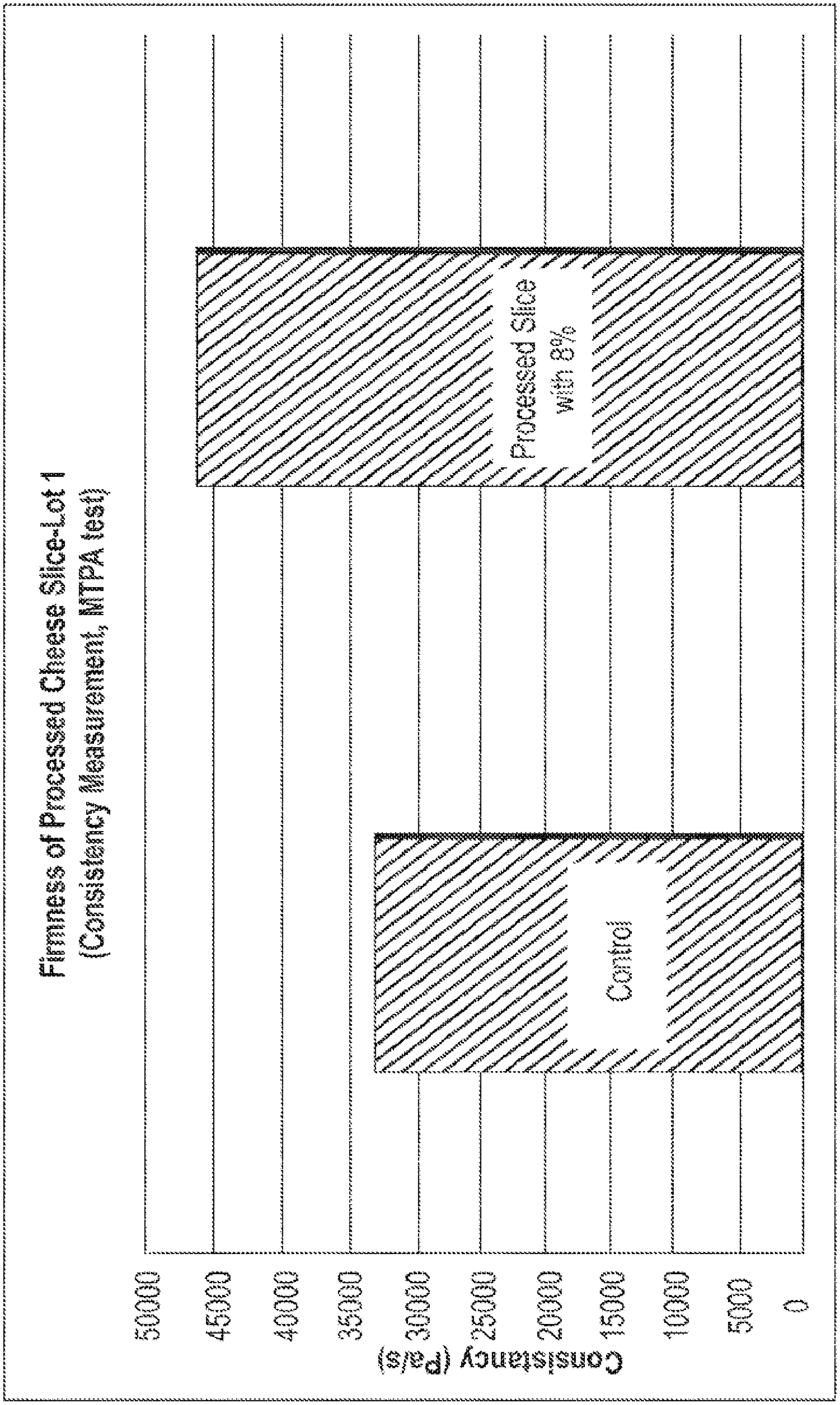
FIG. 7 is a graph showing the consistency measurements for processed cheese with 8 percent cultured dairy components compared to a control without cultured dairy components.
Figure 9:
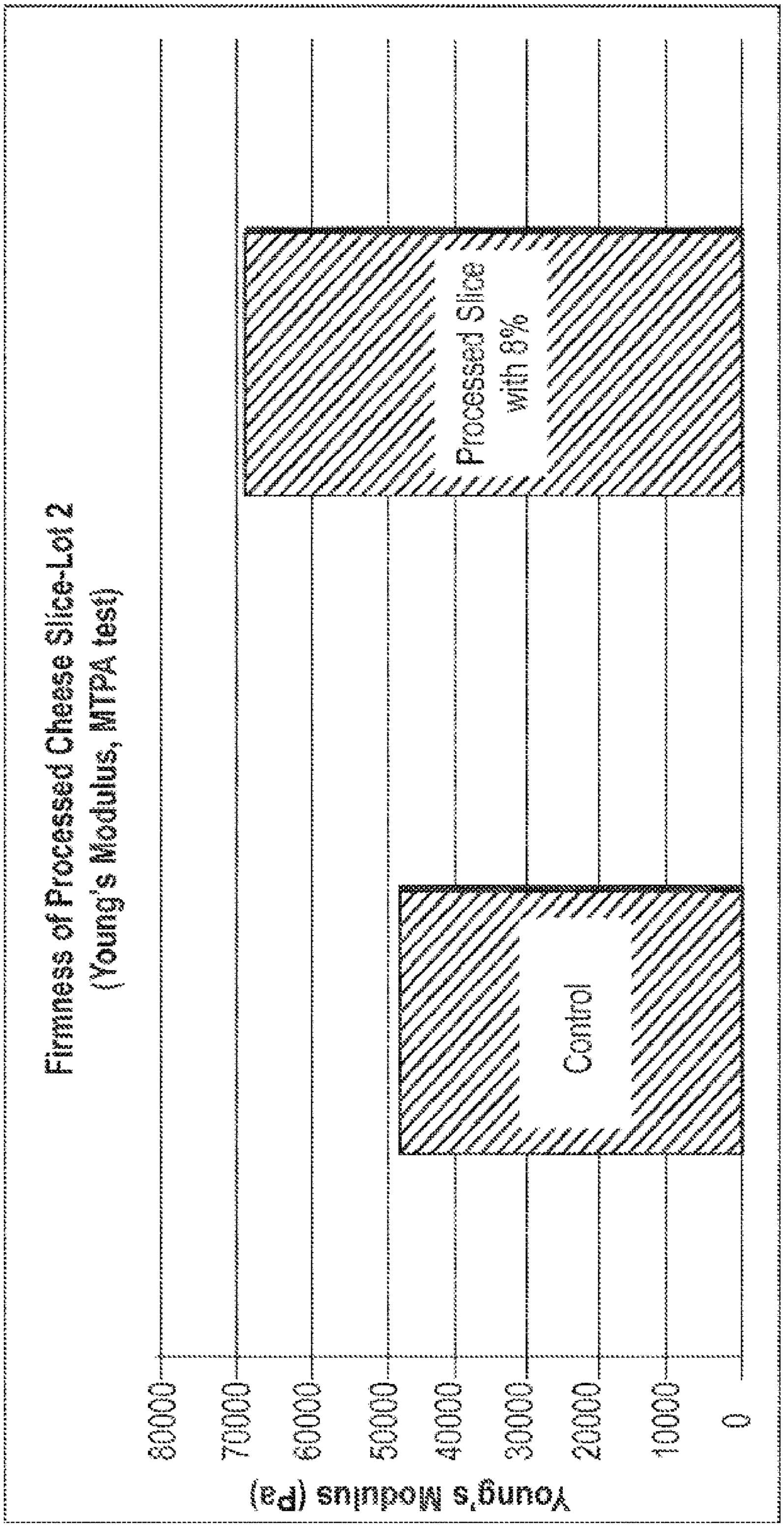
FIG. 9 is a graph showing the consistency measurements for processed cheese with 8 percent cultured dairy components compared to a control without cultured dairy components.

Further, FIGS. 7 and 9 illustrate the consistency of the processed cheese samples via the firmness during flow of the cheese while the force is being applied during the MPTA test. As shown in FIGS. 7 and 9, the processed cheese with cultured dairy components showed increased consistency during flow compared to the samples without cultured dairy components. Generally, this increased firmness during flow also suggests a more natural cheese composition to consumers. As used herein, consistency is generally related to the firmness during flow or resistance to flow. In the context of processed cheese, the higher the consistency value, then the cheese exhibits a slower rate of breakdown in the mouth, which is generally perceived as a desirable characteristic to consumers.

As shown above, processed cheese compositions prepared with cultured dairy components of the present disclosure and made from strain 329 are capable of providing at least equivalent, if not improved, antibacterial properties and preservative functionality. Further, it has been unexpectedly found that processed cheese prepared with these cultured dairy components exhibit improved melt and, at the same time, increased firmness of the processed cheese. Generally, it was previously expected that when cheese melt increases, the firmness decreases. It is believed that the materials generated in the cultured dairy component by strain 329 unexpectedly help to improve both properties of the cheese at the same time.

Example 5

Figure 15A:
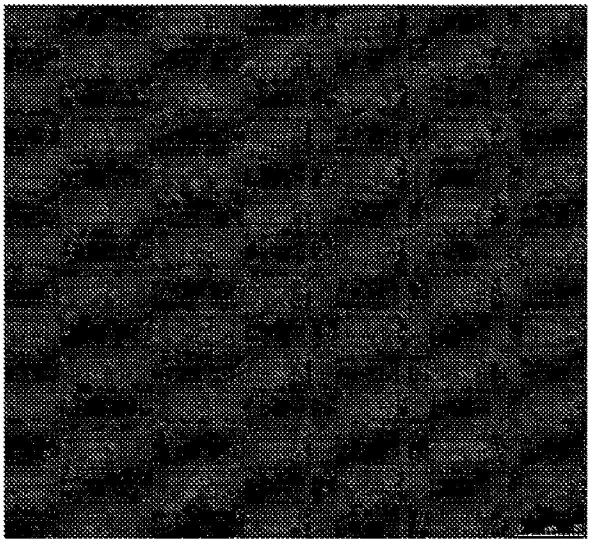
FIG. 15A is a scanning confocal microscopy images showing the absence of EPS prior to inoculation and fermentation with *L. lactis* strain 329
Figure 15B:
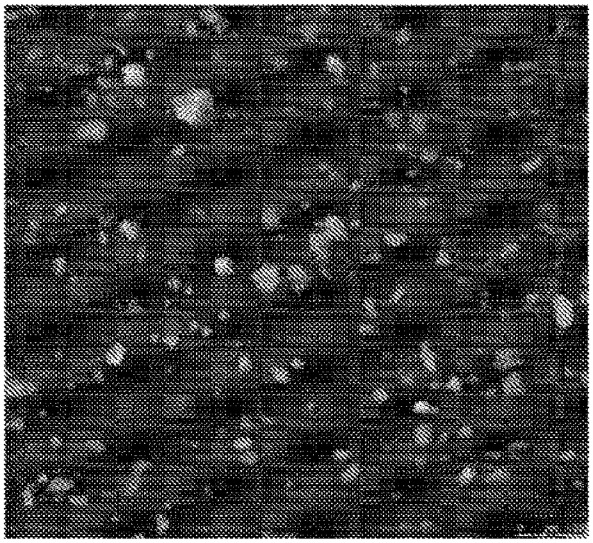
FIG. 15B is a scanning confocal microscopy images showing the presence of EPS after fermentation with *L. lactis* strain 329.

3× milk (pH 5.46) was used as the liquid media for fermentation of cultured dairy components. A sample of the 3× milk was taken prior to inoculation with *L. lactis* strain 329. The cultured dairy components were prepared according to the process of FIG. 1 with an approximately 21 hour fermentation. A further sample was taken after fermentation (pH 5.46). The samples were then stained using Alexa Fluor® 488 conjugate of Concavalin A, which selectively binds to α-mannopyranosyl and α-glucopyranosyl residues, to determine if exopolysaccharides were produced during fermentation. The ConA Alexa Fluor 488 was solubilized in 0.1 M phosphate buffer at pH 6.8 and diluted with whey permeate to pH 6. Drops of staining solution were applied to the samples onto a chambered glass slide and left for 30 minutes at 25° C., The slides were then covered with a glass coverslip and observed with a Leica SP5 confocal scanning laser microscope (CSLM) with a 20× objective with 495 nm (excitation) and 519 nm (emission) wavelengths. As shown in FIGS. 15A and 15B (scale bar 25 μm), exopolysaccharide (EPS) was observed in the fermented sample but not in the 3× milk starting material prior to inoculation with strain 329. EPS was observed as a large aggregated mass.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A processed cheese including natural antimicrobials, the processed cheese comprising:
- about 10 to about 90 percent natural cheese or a mixture of natural cheeses;
- one or more emulsifiers;
- about 8 to about 25 percent protein;
- about 10 to about 30 percent fat;
- about 40 to about 60 percent moisture;
- an amount of nisin, effective to prevent toxin formation from *C. botulinum* determined by toxin bioassay with mice, in the processed cheese at the protein and the fat levels thereof for about 9 days at 86° F.; and
- an amount of exopolysaccharide,
- wherein the nisin and exopolysaccharide are included in the processed cheese in the form of a cultured dairy component,
- the nisin and the exopolysaccharide in the cultured dairy component are obtained from a fermentation of a single lactic acid producing *Lactococcus lactis* strain in a 2× to a 5× concentrated liquid dairy medium,
- the cultured dairy component is effective to achieve a nisin activity ratio of about 0.3 percent or less in the processed cheese, and
- the cultured dairy component is effective to increase the melt and firmness of the processed cheese relative to a processed cheese without the cultured dairy component.

2. The processed cheese of claim 1, wherein the processed cheese includes about 1 to about 100 ppm of nisin and about 100 to about 2,000 ppm of exopolysaccharide.

3. The processed cheese of claim 1, wherein the processed cheese includes about 1 to about 20 percent of the cultured dairy component.

4. The processed cheese of claim 1, wherein the *Lactococcus lactis* strain is an isolated *Lactococcus lactis* strain having all of the identifying characteristics of the *Lactococcus lactis* strain of ATCC PTA-120552.

5. The processed cheese of claim 4, wherein the fermentation of the *Lactococcus lactis* strain ATCC PTA-120552 is conducted in a 3× to a 5× concentrated liquid dairy medium at a temperature of about 25 to about 35° C. and a pH of about 5 to about 6 for about 15 to about 48 hours.

6. The processed cheese of claim 5, wherein the concentrated liquid dairy medium is a concentrated milk having a total solids of about 5 to about 36 percent, about 1 to about 14 percent protein, and about 0 to about 16 percent fat.

7. The processed cheese of claim 1, wherein the processed cheese is free of artificial preservatives selected from the group consisting of sorbic acid, potassium sorbate, nitrites, and mixtures thereof.

8. The processed cheese of claim 1, wherein the nisin is nisin A.

9. The processed cheese of claim 1, wherein the processed cheese includes nisin A and at least one gene from a nisin producing gene cluster with significant homology to the sequences selected from the group consisting of SEQ ID NOS 9 to 19 and at least one gene from an exopolysaccharide producing gene cluster with significant homology to the sequences selected from the group consisting of SEQ ID NOS 21 to 33.

10. The processed cheese of claim 9, wherein the at least one gene from a nisin producing gene cluster and the at least one gene from the exopolysaccharide producing gene cluster are from the same *Lactococcus lactis* strain.

11. The processed cheese of claim 10, wherein the *Lactococcus lactis* strain is an isolated *Lactococcus lactis* strain having all of the identifying characteristics of *Lactococcus lactis* strain ATCC PTA-120552.

12. The processed cheese of claim 1, wherein the processed cheese exhibits a firmness of about 1500 to about 2500 Pa.

13. The processed cheese of claim 1, wherein the processed cheese exhibits a consistency of about 50,000 to about 70,000 Pa/second.

14. The processed cheese of claim 1, wherein the processed cheese exhibits an increase in melt of about 20 to about 75 percent compared to a processed cheese that does not include the cultured dairy component.

15. A processed cheese including natural antimicrobials, the processed cheese comprising:

about 10 to about 90 percent natural cheese or a mixture of natural cheeses;

one or more emulsifiers;

about 8 to about 25 percent protein;

about 10 to about 30 percent fat;

about 40 to about 60 percent moisture;

an amount of nisin, effective to prevent toxin formation from *C. botulinum* determined by toxin bioassay with mice, in the processed cheese at the protein and the fat levels thereof for about 9 days at 86° F.; and an amount of exopolysaccharide, wherein the nisin and exopolysaccharide are included in the processed cheese in the form of a cultured dairy component, the nisin and the exopolysaccharide in the cultured dairy component are obtained from a fermentation of a single lactic acid producing *Lactococcus lactis* strain in a 2× to a 5× concentrated liquid dairy medium, the cultured dairy component is effective to achieve a nisin activity ratio of about 0.3 percent or less in the processed cheese, the cultured dairy component is effective to increase the melt and firmness of the processed cheese relative to a processed cheese without the cultured dairy component, and the processed cheese exhibits a firmness of about 1500 to about 2500 Pa, a consistency of about 50,000 to about 70,000 Pa/second, and an increase in melt of about 20 to about 75 percent compared to a processed cheese that does not include the cultured dairy component.

* * * * *